(12) United States Patent
Allanore et al.

(10) Patent No.: US 12,110,573 B2
(45) Date of Patent: Oct. 8, 2024

(54) SULFIDE REACTIVE VACUUM DISTILLATION, ABSORPTION, STRIPPING, AND EXTRACTION FOR METAL AND ALLOY PRODUCTION

(71) Applicant: Massachusetts Institute of Technology (MIT), Cambridge, MA (US)

(72) Inventors: Antoine Allanore, Brentwood, NH (US); Caspar R. Stinn, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/384,722

(22) Filed: Oct. 27, 2023

(65) Prior Publication Data
US 2024/0052456 A1 Feb. 15, 2024

Related U.S. Application Data

(63) Continuation of application No. PCT/US2022/035296, filed on Jun. 28, 2022.

(60) Provisional application No. 63/216,832, filed on Jun. 30, 2021.

(51) Int. Cl.
*C22B 5/04* (2006.01)
(52) U.S. Cl.
CPC ..................................... *C22B 5/04* (2013.01)
(58) Field of Classification Search
CPC .. C22B 5/04; C22B 59/00; C22B 9/02; C22B 9/04; Y02P 10/20
See application file for complete search history.

(56) References Cited

U.S. PATENT DOCUMENTS

| | | | |
|---|---|---|---|
| 4,419,127 A | 12/1983 | Tanson | |
| 4,735,654 A * | 4/1988 | Cochran | ............... C22B 5/04 75/589 |
| 5,037,608 A * | 8/1991 | Tarcy | .................. C22B 5/04 420/528 |
| 5,152,830 A | 10/1992 | Kobayashi et al. | |
| 5,421,857 A | 6/1995 | Marteanenko et al. | |
| 8,864,873 B2 * | 10/2014 | Chen | ............... C22B 34/1277 75/620 |
| 2006/0226026 A1 | 10/2006 | Van Der Plas et al. | |

(Continued)

OTHER PUBLICATIONS

International Search Report and Written Opinion for International Application No. PCT/US22/35296, mailed Nov. 15, 2022 (11 pages).

(Continued)

*Primary Examiner* — Jie Yang
(74) *Attorney, Agent, or Firm* — Nutter McClennen & Fish LLP

(57) ABSTRACT

In accordance with one embodiment, a method comprises dissolving a sulfide of a first metal in a solvent comprising molten aluminum; aluminothermically reduce at least a portion of the sulfide through reactive vacuum distillation to form gaseous aluminum sulfide distillate and elemental first metal that remains in the molten aluminum; and at least one of (e.g., one, two, or all three of) (a) reacting the aluminum sulfide distillate with at least one material in the molten aluminum; (b) reacting the aluminum sulfide distillate with at least one material outside of the molten aluminum; or (c) condensing the gaseous aluminum sulfide distillate.

19 Claims, 17 Drawing Sheets

(56) References Cited

U.S. PATENT DOCUMENTS

| | | |
|---|---|---|
| 2012/0304823 A1 | 12/2012 | Chen et al. |
| 2013/0165317 A1 | 6/2013 | Gabrielov et al. |
| 2018/0202024 A1 | 7/2018 | Feng et al. |
| 2021/0277531 A1 | 9/2021 | Allanore et al. |

OTHER PUBLICATIONS

Setoudeh, N., et al., "Metallothermic Reduction of Zinc Induced by Ball Milling," J. Mater Sci (2017) pp. 6388-6400 (13 pages).

Shoemaker, D., et al., "Understanding Fluxes as Media for Directed Synthesis: In Situ Local Structure of Molten Potassium Polysulfides," Journal of the American Chemical Society (2012), vol. 134, 9456-9463, 8 pages.

Sklyarchuk, V., et al., "Semiconductor-Metal Transition in Semiconductor Melts with 3d Metal Admixtures," IOP Publishing, 13th International Conference on Liquid and Amorphous Metals, Journal of Physics: Conference Series 98 (2008), 6 pages.

Skylarchuk, V., et al., "Thermophysical Properties of Liquid Ternary Chalcogenides," High Temperatures—High Pressures, 2002, vol. 34, pp. 29-34, 6 pages.

Sokhanvaran, S., et al., "Electrochemistry of Molten Sulfides: Copper Extraction from BaS-Cu2S," Journal of The Electrochemical Society, 163 (3) D115-D120 (2016), 6 pages.

Stinn, C., et al. "Selective Sulfidation and Electrowinning of Nickel and Cobalt for Lithium Ion Battery Recycling," The Minerals, Metals & Materials Services, (2021) pp. 99-110 (12 pages).

Stinn, C., et al., "Estimating the Capital Costs of Electrowinning Processes," Electrochem Soc. Interface (Summer 2020), 8 pages.

Stinn, C., et al., "Selective Sulfidation of Metal Compounds," Nature, https://doi.org/10.1038/s41586-021-04321-5, 25 pages, Published on Dec. 2021.

Suzdaltsev, A.V., et al., "Review-Synthesis of Aluminum Master Alloys in Oxide Fluoride Melts: A Review," J. Electrochem. Soc., 2020, vol. 167 (23 pages).

Suzuki, N., et al., "Calcium Reduction of TiS2 in CaCl2 Melt," Material Transactions, vol. 58, No. 3 (2017) pp. 367-370 (4 pages).

Tan, M., et al., "Electrochemical Sulfur Removal from Chalcopyrite in Molten NaCl—KCl," Electrochimica Acta 213 (2016) 148-154, 7 pages.

Vivian, R., et al., "The Electrolysis of Molten Antimony Sulfide," Presented at Sixty-ninth General Meeting, held at Cincinnati, Ohio, Apr. 25, 1936 (4 pages).

Vogel, H., et al., "An Estimation of PFC Emission by Rare Earth Electrolysis," The Minerals, Metals & Materials Society 2018, Light Metals 2018, pp. 1507-1517 (11 pages).

Wan, H., "A Novel Method of AIV55 Alloy Production by UtilizingAIV65 Alloy Scrap," Vacuum 155 (2018) 127-133 (7 pages).

Wang, J., et al., "Mechanical Sulfidization of Nonferrous Metal Oxides by Grinding with Sulfur and Iron," Ind. Eng. Chem. Res., 2003, 42, pp. 5813-5818 (6 pages).

Wang, T., et al., "Electrolysis of Solid Metal Sulfide to Metal and Sulfur in Molten NaCl—KCl," Electrochemistry Communications 13 (2011) 1492-1495 (4 pages).

Waudby, P.E., "Rare Earth Additions to Steel," International Metals Reviews, vol. 23, 1978, pp. 74-98 (28 pages).

Yang, J., et al., "Behavior of Magnesium in the Desulfurization Process of Molten Iron with Magnesium Vapor Produced In-situ by Aluminothermic Reduction of Magnesium Oxide," ISIJ International, vol. 42 (2002), No. 7 pp. 685-693 (9 pages).

Yang, J., et al., Simultaneous Desulfurization and Deoxidation of Molten Steel with in Situ Produced Magnesium Vapor, ISIJ International, vol. 47 (2007), No. 3, pp. 418-426 (9 pages).

Yucel, O., et al., "The Preparation of Ferroboron and Ferrovanadium by Aluminothermic Reduction," High Temperature Materials and Processes, vol. 15, Nos. 1-2, 1996, pp. 103-109 (8 pages).

Zhang, L., et al., "Removal of Impurity Elements from Molten Aluminum: A Review," Mineral Processing & Extractive Metallurgy Review (2011), pp. 150-228 (80 pages).

Zhao, K., et al., Cleaner Production of Ti Powder by a Two-Stage Aluminothermic Reduction Process, The Minerals, Metals & Materials Society (2017), pp. 1795-1800 (6 pages).

Ahmad, S., et al., "Sulfidation Kinetics of Natural Chromite Ore Using H2S Gas," Metallurgical and Materials Transactions B, vol. 46B, Apr. 2015, pp. 557-567 (11 pages).

Ahmadi, E., et al., "An Innovative Process for Production of Ti Metal Powder via TiSx from TiN," Metallurgical and Materials Transactions B, vol. 51B, Feb. 2020, pp. 140-148 (9 pages).

Akhgar, B.N., et al., "Mechanochemical Reduction of Natural Pyrite by Aluminum and Magnesium," Journal of Alloys and Compounds, vol. 657 (2016) 144-151 (8 pages).

Ali, S., et al., "Mineral Supply for Sustainable Development Requires Resource Governance," Nature, vol. 543, Mar. 2017, 7 pages.

Allanore, A., "Contribution of Electricity to Materials Processing: Historical and Current Perspectives," Journal of The Minerals, Metals & Materials Society, vol. 65, No. 2 (2013) pp. 130-135 (6 pages).

Biswas, A., et al., "Iron- and Steel-Making Process," Introduction to Refractories for Iron- and Steelmaking, Springer Nature Switzerland AG 2020, pp. 99-145 (47 pages).

Biswas, A., et al., "Synthesis of Neodymium Aluminide by Aluminothermic Reduction of Neodymium Oxide," Metallurgical and Materials Transactions B, vol. 29B, Apr. 1998, pp. 309-315 (7 pages).

Brinkmann, F., et al., "Metallothermic Al—Sc Co-Reduction by Vacuum Induction Melting Using Ca," MDPI Metals, 2019 (12 pages).

Capuzzi, S., et al., "Preparation and Melting of Scrap in Aluminum Recycling: A Review," MDPI, Metals (2018) 24 pages.

Chen, G.Z., et al., "Cathodic Refining in Molten Salts: Removal of Oxygen, Sulfur and Selenium from Static and Flowing Molten Copper," Journal of Applied Electrochemistry, vol. 31, 155-164, (2001), 10 pages.

Chung, D.Y., et al., "Complex Bismuth Chalcogenides as Thermoelectrics," 16th International Conference on Thermoelectrics (1997), pp. 459-462 (4 pages).

Ciez, R., et al., "Examining Different Recycling Processes for Lithium-ion Batteries," Nature Sustainability, vol. 2, Feb. 2019, pp. 148-156 (9 pages).

Cleaver, B., et al., "Properties of Fused Polysulphides-VII. The Phase Diagram Li2S/Na2S/S," Electrochimica Acta, vol. 36, No. 3/4, pp. 673-677, 1991 (5 pages).

Crundwell, F., et al., "Extractive Metallurgy of Nickel, Cobalt and Platinum-Group Metals," Elsevier Publishing, 583 pages, Published on 2011.

De Souza, O., et al., "Mining, Ore Preparation and Ferroniobium Production at CBMM," 1981, pp. 113-132 (20 pages).

Dietl, J., "Aluminothermic Reduction of Quartz Sand," Commission of the European Communities, Fourth E.C. Photovoltaic Solar Energy Conference ECSC, EEC, EAEC, Brussels and Luxembourg, 1982, pp. 941-945 (5 pages).

Gao, H., et al., "Preparation of Mo Nanopowders through Electroreduction of Solid MoS2 in Molten KCl—NaCl," Physical Chemistry Chemical Physics, 2014, vol. 16, 19514-19521, (8 pages).

Ge, X., et al., "Copper Extraction from Copper Ore by Electro-Reduction in Molten CaCl2—NaCl," Electrochimica Acta 54 (2009) 4397-4402 (6 pages).

Ge, X.L., et al., "The Salt Extraction Process—a Novel Route for Metal Extraction Part 2—Cu/Fe extraction from Copper Oxide and Sulphides," Mineral Processing and Extractive Metallurgy, 93-100 (Jul. 18, 2013) 9 pages.

Gibbard, K., et al., "Kinetics of Thermal Synthesis of Cerium Sulfides," Journal of Nuclear Materials, vol. 378 (2008) pp. 291-298 (8 pages).

Han, J., et al., Selective Sulfidation of Lead Smelter Slag with Sulfur, The Minerals, Metals & Materials Society and ASM International 2015, vol. 47B, Feb. 2016, pp. 344-354 (11 pages).

Harris, C.T., et al., Selective Sulphidation of a Nickeliferous Lateritic Ore, Minerals Engineering, vol. 24, (2011) pp. 651-660 (10 pages).

(56) References Cited

OTHER PUBLICATIONS

Hendricks, T., et al., "Engineering Scoping Study of Thermoelectric Generator Systems for Industrial Waste Heat Recovery," U.S. Department of Energy, Industrial Technologies Program, Nov. 2006, 74 pages.

Hosseinpouri, M., "Production of Al—Ti Master Alloy by Aluminothermic Reduction Technique," Canadian Metallurgical Quarterly, vol. 46 No. 2 (2007) pp. 139-144 (7 pages).

Jones, T., "Manganese," Manganese (1998), 17 pages.

Kaneko, T., et al., "Synthesis of Sc Sulfides by CS2 Sulfurization," Journal of Solid State Chemistry, vol. 285 (2020) pp. 1-8 (8 pages).

Kanibolotsky, D.S., et al., "Thermodynamic Properties of Liquid Al—Si and Al—Cu Alloys," Journal of Thermal Analysis and Calorimetry, vol. 70 (2002) pp. 975-983 (9 pages).

Kellogg, H.H., "Vaporization Chemistry in Extractive Metallurgy," 1966 Extractive Metallurgy Lecture (1966) 16 pages.

Lan, Z., et al., "Recovery of Zn, Pb, Fe and Si from a Low-Grade Mining Ore by Sulfidation Roasting-Beneficiation—Leaching Processes," Springer Nature 2020, pp. 37-51 (15 pages).

Lee, J., et al., "Pathways for Greening the Supply of Rare Earth Elements in China," Nature Sustainability, vol. 1, Oct. 2018, pp. 598-605, 8 pages.

Li, G., et al., "Electrolysis of Solid MoS2 in molten CaCl2 for Mo Extraction without Co2 Emission," Electrochemistry Communications 9 (2007) 1951-1957 (7 pages).

Li, L., et al., "Research Progress on the Preparation of Al—Sc Master Alloy by Molten Salt Electrolysis Method," (2018) pp. 3768-3773 (6 pages).

Lindberg, D., et al., "Thermodynamic Evaluation and Optimization of the (Na + K + S) System," J. Chem. Thermodynamics 38 (2006) 900-915 (16 pages).

Liu, W., et al., "Sulfidation Mechanism of ZnO Roasted with Pyrite," Scientific Reports (2018) pp. 1-12 (12 pages).

Liu, X., et al., "Thermodynamic Assessment of the Aluminum-Manganese (Al—Mn) Binary Phase Diagram," Journal of Phase Equilibria (1999) vol. 20 No. 1, pp. 45-56 (12 pages).

Lytvynenko, Y., et al., "Aluminothermic Reduction of Metal Oxides by Concentrated Solar Irradiation," Alternative Energy in Materials Processing, JOM, pp. 46-48 Sep. 2010 (3 pages).

Martirosyan, V., et al., "Sulfur Dioxide Utilization by the Treatment of Pyrite-Chalcopyrite Sulfide Consentrates, Combing Mechanical and Metallothermic Processes," Food and Environmental Safety—Journal of Faculty of Food Engineering, Stefan cel MareUniversity—Suceava vol. X, Issue 4—2011, pp. 24-29 (6 pages).

Mohammadi, A., et al., "Design and analysis of a Suction Mechanism for the Vacuum Degassing Process," Ironmaking and Steelmaking: Processes, Products and Applications, 2021, vol. 48, No. 4, 457-465 (10 pages).

Mukherjee, T.K., et al., "Molybdenum Extraction from Molysulfide," Metallurgical Transaction, vol. 5, Mar. 1974, pp. 707-713 (7 pages).

Nassar, N., "By-product Metals are Technology Essential but have Problematic Supply," Sci. Adv., Apr. 3, 2015, pp. 1-10 (11 pages).

Neronov, V., et al., Preparation and Properties of Aluminum Borides, Institute of Problems of the Study of Materials, Academy of Sciences, Ukrainian SSR, No. 7 (31), Jul. 1965, pp. 571-575 (5 pages).

Neusser, G., et al., "Experimental Na/K Exchange between Alkali Feldspar and an NaCl—KCl Salt Melt: Chemically Induced Fracturing and Element Partitioning," Contrib Mineral Petrol (2012) 164:341-358 (18 pages).

Nunes, R., et al., "Properties and Selection: Nonferrous Alloys and Special-Purpose Materials," ASM Handbook (1990), vol. 2, 3470 pages.

Oyamada, H., et al., "Activity Measurement of the Constituents in Liquid Cu—Al Alloy with Mass-Spectrometry," Materials Transactions, JIM, vol. 39, No. 12 (1998) pp. 1225-1229 (5 pages).

Rasheed, M., et al., "Review of the Liquid Metal Extraction Process for the Recovery of Nd and Dy from Permanent Magnets," The Minerals, Metals & Materials Society and ASM International 2021, pp. 1213-1227 (15 pages).

Rinzler, C., et al., "A Thermodynamic Basis for the Electronic Properties of Molten Semiconductors: The Role of Electronic Entropy," Philosophical Magazine 97, 8 (Dec. 2016) 561-571, 21 pages.

Rinzler, C., et al., "Connecting Electronic Entropy to Empirically Accessible Electronic Properties in High Temperature Systems," Philosophical Magazine 96, 29 (Sep. 2016) 3041-3053 (32 pages).

Royset, J., et al., "Scandium in Aluminum Alloys," International Materials Reviews, 2005, vol. 50, No. 1, pp. 19-44 (27 pages).

Sahu, S., et al., "Electrolytic Extraction of Copper, Molybdenum and Rhenium from Molten Sulfide Electrolyte," Electrochimica Acta 243 (2017) pp. 382-389 (8 pages).

Scheel, H.J., "Crystallization of Sulfides from Alkali Polysulfide Fluxes," Journal of Crystal Growth 24/25 (1974) pp. 669-673 (5 pages).

United States Patent and Trademark Office, Non-Final Office Action, for U.S. Appl. No. 17/134,429, dated Apr. 2, 2024, 24 pages.

* cited by examiner

Figure 6: Partial vapor pressures of some alloying elements in binary aluminum alloys up to the solubility limit (X) at 1300 °C.

Figure 7: Critical aluminum sulfide partial pressure ($[P_{Al_2S_3}]_{crit}$) required for aluminothermic reduction of a sulfide to produce a binary aluminum alloy up to the alloy's solubility limit (X) at 1300 °C.

(1902) Dissolve a sulfide of a first metal in a solvent comprising molten aluminum

(1904) Aluminothermically reduce at least a portion of the sulfide through reactive vacuum distillation to form gaseous aluminum sulfide distillate and elemental first metal that remains in the molten aluminum

(1906) Optionally react the aluminum sulfide distillate with at least one material in the molten aluminum and/or at least one material outside of the molten aluminum

(1908) Optionally condense the gaseous aluminum sulfide distillate

(1910) Optionally add a third metal to the molten aluminum to produce an alloy including the third metal and at least one of aluminum or the first metal

(1912) Optionally recover at least some of the first metal from the molten aluminum

(1914) Optionally oxidize at least some of the first metal in the molten aluminum

(1916) Optionally extract sulfide from a surrounding oxide via selective aluminothermic reduction of the sulfide

(1918) Optionally include at least one other element in the molten aluminum that forms at least one gaseous volatile sulfide that in turn assists the aluminum in reduction

FIG. 19

SULFIDE REACTIVE VACUUM DISTILLATION, ABSORPTION, STRIPPING, AND EXTRACTION FOR METAL AND ALLOY PRODUCTION

CROSS-REFERENCE TO RELATED APPLICATION(S)

This patent application is a continuation of International Application No. PCT/US$_{22/35296}$ entitled Sulfide Reactive Vacuum Distillation, Absorption, Stripping, and Extraction for Metal and Alloy Production filed Jun. 28, 2022, which claims the benefit of U.S. Provisional Patent Application No. 63/216,832 entitled Aluminothermic Reactive Vacuum Distillation, Absorption, Stripping, and Extraction for Metal and Alloy Production filed Jun. 30, 2021, each of which is hereby incorporated herein by reference in its entirety.

As described herein, certain embodiments can be used in conjunction with a selective sulfidation process that can be used, for example, and without limitation, to produce metal sulfides for subsequent aluminothermic processing or to perform selective sulfidation on an aluminothermically produced material. Certain exemplary selective sulfidation processes that can be used in conjunction with certain embodiments are described in U.S. patent application Ser. No. 17/134,429 entitled SELECTIVE SULFIDATION AND DESULFIDATION filed Dec. 27, 2020 published as U.S. Patent Application Publication No. US2021/0277531 on Sep. 9, 2021, which claims the benefit of U.S. Provisional Patent Application No. 62/982,373 entitled SELECTIVE SULFIDATION AND DESULFIDATION filed Feb. 27, 2020, each of which is hereby incorporated herein by reference in its entirety.

STATEMENT REGARDING FEDERALLY SPONSORED RESEARCH

This invention was made with Government support under Grant No. DE-EE0008316 awarded by the Department of Energy (DOE). The Government has certain rights in the invention.

FIELD OF THE INVENTION

The invention generally relates to aluminothermic reaction processes and systems.

BACKGROUND OF THE INVENTION

Growing industrial and societal concerns surrounding the environmental sustainability of conventional metallurgical processing have motivated the development of new metal sulfide feedstocks to reduce emissions and pollution. Meanwhile, increasing supply uncertainty for many critical alloying elements has motivated the development of new recycling streams to supplement primary production. Conventional metallurgical reduction and refining technologies are generally ill-equipped to deal with novel sulfide feedstocks and the presence of increased impurities in recycled feedstocks.

Growing concern surrounding emissions and pollution in metallurgical sectors, coupled with rising mining costs associated with widespread depletion of high value metal ore bodies, are presently motivating an industry-wide review of the optimal chemistries for economical and sustainable metal production in the 21$^{st}$ century [1-9]. Concurrently, recycling of metallic elements has become increasingly cumbersome due to ever more-complicated material applications, resulting in many convoluted waste streams unsuitable for recycling by the standard process of melting scrap and reintroducing it with new material in the primary production pathway [10-13]. Furthermore, high costs, as well as increasing supply uncertainty for critical metallic elements due to geographic concentration of metal production infrastructure in foreign countries such as China, pressures metal alloy producers to aim for higher product yields per unit of material processed [14]. Taken together, these changing industry circumstances present a grim outlook for many conventional metal alloy production processes.

Aluminum and steel are the most commonly used metal alloys. However, within aluminum and steel, the presence of other alloying elements, including lithium, beryllium, boron, carbon, nitrogen, oxygen, magnesium, silicon, sulfur, scandium, titanium, vanadium, chromium, manganese, cobalt, nickel, copper, zinc, yttrium, zirconium, niobium, molybdenum, tungsten, lead, and the lanthanides, are responsible for the distinct behaviors of different metal alloys. In these alloys, the base metal (iron or aluminum) serves as a solvent for the other alloying elements, solutes. This relationship with alloying element solutes is equally critical for metal alloys containing other base metal solvents, such as nickel, titanium, and chromium. Production of metal alloys, from both freshly mined ores as well as from recycled materials, necessitates the careful introduction of required solute alloying elements to and removal of undesired elements from the base metal solvent. Element addition is accomplished through dissolving solute compounds rich in the alloying element, called master alloys, into the molten base metal solvent. Meanwhile, removal of undesirable elements from the molten base metal solvent is accomplished through refining processes, in which immiscible liquids, termed slags, are contacted with the base metal solvent to selectively remove impurities, in a process known as slag refining. Alternatively, gasses may be blown through the molten base metal solvent to remove impurities into the gas phase, in a process known as stripping. In recycling, either the base metal solvent or one or more alloy element solutes may take the role(s) of the target product and may be processed via conventional refining techniques in either the molten state or in an aqueous state following complete hydrometallurgical dissolution.

Industrially, a growing movement has developed to reimagine the chemistries associated with master alloy production, alloy refining, and recycling in ways that reduce the costs associated with meeting sustainability metrics and challenges surrounding growing alloying element criticality, with an aim to geographically diversity alloy production infrastructure. The current state of the art and industrial practice surrounding alloy production and refining of impurities from recycled metallic materials is described below.

Many master alloys for aluminum and ferrous products have been conventionally produced via coreduction of the alloying agent and base metal via carbothermic smelting, electrowinning, or metallothermic reduction. Examples of co-smelting via carbothermic reduction include ferronickel [15], ferromanganese [15], and ferromolybdenum production from mixed metal oxides. A multitude of examples of coreduction for master alloy production via electrowinning exist, notably molten salt electrolysis for aluminum-scandium, aluminum-zirconium, aluminum-silicon, aluminum-boron, and iron-dysprosium production from mixed oxides and halides [17-19]. Examples of metallothermic reduction of oxides for master alloy production are prevalent [20,21], include ferrovanadium and ferroniobium production via aluminothermic reduction of their mixed oxides [22,23], aluminum-scandium production via calciothermic reduction of their mixed oxides [24], and aluminum-neodymium and aluminum-silicon production via aluminothermic reduction of the oxide in the presence of excess aluminum [25,26]. Liquid metal extractants have been employed to selectively leach and metallothermically reduce individual components of a feedstock [57]. In other cases, master alloys are produced via mixing the pure elements. Examples include aluminum-manganese and aluminum-titanium master alloys and mischmetal addition to steel, however, master alloy production from the pure metals is often problematic due to poor mixing of the components and the loss of alloying elements to slag phases [27-29].

Master alloy production is almost exclusively conducted using oxide or halide chemistries. Limited examples exist for master alloy production from sulfides, with molybdenum being among the most common examples [16]. More recently, copper, iron, and zinc sulfides have been aluminothermically reduced during mechanical alloying [30-32]. Aluminothermic reduction has also been conducted to convert rare earth sesquisulfides to monosulfides, while rare earth monosulfides may be platinothermically reduced to rare earth platinum alloys [33]. However, to our knowledge, aluminothermic reduction has rarely been attempted for most metals not found as sulfides in commercially-relevant ore bodies. Liquid metal extractants have seen limited deployment for master alloy production or materials separation from sulfides. To our knowledge, liquid metal extractants have never been produced in situ via metallothermic reduction or thermal decomposition of sulfides.

Nevertheless, the economic and environmental benefits [6,34] of metal production from sulfides have recently attracted significant attention, motivating a wave of technologies to convert oxides to sulfides. Examples include reaction with elemental sulfur, carbon disulfide, or hydrogen sulfide to produce numerous rare earth and transition metal sulfides relevant for metal alloy production [1-8,35]. These new sulfide feedstocks require new metal reduction technologies, which have presently focused on molten sulfide electrolysis and calciothermic reduction via the FFC-Cambridge process [3,5-7]. Aluminothermic reduction of synthetic metal sulfides has yet to be widely considered for metal and alloy production. Furthermore, despite the emergence of selective sulfidation technologies to preferentially convert individual components of mixed oxides into sulfides [1,2,4,5,35], metallothermic reduction or metallothermic extraction of the mixed oxide-sulfide has not been attempted to selectively form alloys from or reduce either the oxide or sulfide. Similarly, reactive vacuum distillation has not previously been employed for the aluminothermic reduction of sulfides. Aluminothermic reduction of pure oxides has been attempted in the presence of liquid aluminum sulfide however, where the immiscible sulfide, or matte, phase served as a means to sequester impurities in the system [25,36].

In the context of metal recycling, the mixing of scrap and virgin metal is limited by the presence of impurities in the scrap. Impurities must be managed through metal refining processes or sufficiently diluted with high purity feedstock. Molten state refining processes generally consist of vacuum degassing, slag refining, and gas-fluxing [37-39]. Vacuum degassing consists of reducing the pressure of the gas atmosphere over the melt, resulting in the evaporation of volatile components from the melt, and is used in steel, aluminum, and other metal alloy production [37-39]. Slag refining, accomplished by contacting the liquid metal phase with an immiscible nonmental phase that preferentially extracts impurities, is also used across the metallurgical industries, via oxide and halide slags respectively [37-39]. Gas fluxing is a stripping process in which gaseous oxygen, nitrogen, argon, chlorine, or magnesium are used as stripping agents and blown through the melt in order to oxidize metallic or reduce non-metallic impurities in the melt [37-39]. The use of chlorine as a stripping agent, critical for aluminum refining, has recently been banned in Europe [38]. The use of gaseous magnesium for desulfurization of steels [40-41] is the only instance we are aware of in which the stripping agent is generated in situ as the product of an aluminothermic reduction process.

The following are some references cited herein (with references in brackets) or otherwise possibly applicable to the present disclosure:

1. Zhuo-yue, L. et al. Recovery of Zn, Pb, Fe and Si from a low-grade mining ore by sulfidation roasting-beneficiation-leaching processes. J. Cent. South Univ. 27, 37-51 (2020).
2. Han, J., Liu, W., Wang, D., Jiao, F. & Qin, W. Selective Sulfidation of Lead Smelter Slag with Sulfur. Metall. Mater. Trans. B Process Metall. Mater. Process. Sci. 47, 344-354 (2016).
3. Ahmadi, E. & Suzuki, R. 0. An Innovative Process for Production of Ti Metal Powder via TiS x from TiN. Metall. Mater. Trans. B 51B, 140-148 (2020).
4. Harris, C. T., Peacey, J. G. & Pickles, C. A. Selective sulphidation of a nickeliferous lateritic ore. Miner. Eng. 24, 651-660 (2011).
5. Stinn, C. & Allanore, A. Selective Sulfidation and Electrowinning of Nickel and Cobalt for Lithium Ion Battery Recycling. in Minerals, Metals and Materials Series 99-110 (Springer Science and Business Media Deutschland GmbH, 2021). doi:10.1007/978-3-030-65647-8_7.
6. Sahu, S. K., Chmielowiec, B. & Allanore, A. Electrolytic Extraction of Copper, Molybdenum and Rhenium from Molten Sulfide Electrolyte. Electrochim. Acta 243, 382-389 (2017).
7. Ahmadi, E. & Suzuki, R. 0. Tantalum Metal Production Through High-Efficiency Electrochemical Reduction of TaS2 in Molten CaCl2. J. Sustain. Metall. 7, 437-447 (2021).
8. Kaneko, T., Yashima, Y., Ahmadi, E., Natsui, S. & Suzuki, R. O. Synthesis of Sc sulfides by CS2 sulfurization. J. Solid State Chem. 285, 121268 (2020).
9. Suzuki, N. et al. Calcium Reduction of TiS 2 in CaCl 2 Melt. Mater. Trans. 58, 367-370 (2017).
10. Ciez, R. E. & Whitacre, J. F. Examining different recycling processes for lithium-ion batteries. Nat. Sustain. 2, 148-156 (2019).
11. Enriquez, M. A. et al. Mineral supply for sustainable development requires resource governance. Nature 543, 367-372 (2017).
12. Olivetti, E. A. & Cullen, J. M. Toward a sustainable materials system. Science (80-.). 360, 1396-1398 (2018).
13. K Lee, J. C. & Wen, Z. Pathways for greening the supply of rare earth elements in China. Nat. Sustain. 1, 598-605 (2018).
14. Nassar, N. T., Graedel, T. E. & Harper, E. M. By-product metals are technologically essential but have problematic supply. Sci. Adv. 1, e1400180 (2015).
15. Crundwell, F. K., Moats, M. S., Ramachandran, V., Robinson, T. G. & Davenport, W. G. Extractive Metallurgy of Nickel, Cobalt, and Platinum-Group Metals. (Elsevier, 2011).

16. Mukherjee, T. K. & Gupta, C. K. Molybdenum Extraction from Molysulfide. Metall. Trans. 5, 707-714 (1974).
17. Li, L., Wang, T., Huang, X. & Huang, J. Research Progress on the Preparation of Al—Sc Master Alloy by Molten Salt Electrolysis Method. Cailiao Daobao/Materials Review vol. 32 3768-3773 (2018).
18. Suzdaltsev, A. V., Pershin, P. S., Filatov, A. A., Nikolaev, A. Y. & Zaikov, Y. P. Review—Synthesis of Aluminum Master Alloys in Oxide-Fluoride Melts: A Review. J. Electrochem. Soc. 167, 102503 (2020).
19. Vogel, H. & Friedrich, B. rare earth. in Dictionary of Gems and Gemology 714-714 (Springer Berlin Heidelberg, 2009). doi:10.1007/978-3-540-72816-0_18046.
20. Lytvynenko, Y. M. Aluminothermic reduction of metal oxides by concentrated solar irradiation. JOM 62, 46-48 (2010).
21. Tanson, A. Metallothermal Process for Reducing Metal Oxides. (1983).
22. De Souza, O., Filho, P. & De Fuccio, R. MINING, ORE PREPARATION AND FERRONIOBIUM PRODUCTION AT CBMM.
23. Yücel, O., Cinar, F., Addemir, O. & Tekin, A. The preparation of ferroboron and ferrovanadium by Aluminothermic reduction. High Temp. Mater. Process. 15,103-109 (1996).
24. Brinkmann, F., Mazurek, C. & Friedrich, B. Metallothermic Al—Sc co-reduction by vacuum induction melting using Ca. Metals (Basel). 9, 1223 (2019).
25. Dietl, J., Holm, C. & Sirtl, E. ALUMINOTHERMIC REDUCTION OF QUARTZ SAND. in Fourth E. C. Photovoltaic Solar Energy Conference 941-945 (1982).
26. Biswas, A., Sharma, I. G., Kale, G. B. & Bose, D. K. Synthesis of Neodymium Aluminide by Aluminothermic Reduction of Neodymium Oxide. Metall. Mater. Trans. B 29B, 309-315 (1998).
27. Hosseinpouri, M., Mirmonsef, S. A. & Soltanieh, M. Production of Al—Ti Master Alloy by Aluminothermic Reduction Technique. Can. Metall. Q. 46,139-143 (2007).
28. Waudby, P. E. Rare earth additions to steel. Int. Met. Rev. 23,74-98 (1978).
29. Wan, H. et al. A novel method of AlV55 alloy production by utilizing AlV65 alloy scrap. Vacuum 155, 127-133 (2018).
30. Akhgar, B. N. & Pourghahramani, P. Mechanochemical reduction of natural pyrite by aluminum and magnesium. J. Alloys Compd. 657, 144-151 (2016).
31. Setoudeh, N. & Welham, N. J. Metallothermic reduction of zinc sulfide induced by ball milling. J. Mater. Sci. 52,6388-6400 (2017).
32. Martirosyan, V., Aghamyan, T., Sasuntsyan, M., Ajvazyan, A. & Zaprosyan, A. SULFUR DIOXSIDE UTILIZATION BY THE TREATMENT OF PYRITE-CHALCOPYRITE SULFIDE CONSENTRATES, COMBINING MECHANICAL AND METALLO-THERMIC PROCESSES. Journal of Faculty of Food Engineering, Ștefan cel MareUniversity-Suceava vol. X http://fia-old.usv.ro/fiajournal/index.php/FENS/article/view/320 (2017).
33. Gibbard, K. B., Allahar, K. N., Kolman, D. & Butt, D. P. Kinetics of thermal synthesis of cerium sulfides. J. Nucl. Mater. 378, 291-298 (2008).
34. Stinn, C. & Allanore, A. Estimating the Capital Costs of Electrowinning Processes. Electrochem. Soc. Interface 29, 44-49 (2020).
35. Liu, W., Zhu, L., Han, J., Jiao, F. & Qin, W. Sulfidation mechanism of ZnO roasted with pyrite. Sci. Rep. 8, 9516 (2018).
36. Samsonov, G. V. PREPARATION AND PROPERTIES OF ALUMINUM BORIDES. Poroshkovaya Metallurgiya (1965).
37. Mohammadi, A., Aghaie, H. R. & Saghafian, M. Design and analysis of a suction mechanism for the vacuum degassing process Design and analysis of a suction mechanism for the vacuum degassing process. Iron Steelmak. 48, 457-465 (2021).
38. Zhang, L., Lv, X., Torgerson, A. T. & Long, M. Mineral Processing & Extractive Metallurgy Review Removal of Impurity Elements from Molten Aluminum: A Review REMOVAL OF IMPURITY ELEMENTS FROM MOLTEN ALUMINUM: A REVIEW. Miner. Process. Extr. Metall. Rev. 32, 150-228 (2011).
39. Biswas, S. & Sarkar, D. Iron- and Steel-Making Process. in Introduction to Refractories for Iron- and Steelmaking 99-145 (Springer International Publishing, 2020). doi:10.1007/978-3-030-43807-4_2.
40. Yang, J., Okumura, K., Kuwabara, M. & Sano, M. Behavior of magnesium in the desulfurization process of molten iron with magnesium vapor produced in-situ by aluminothermic reduction of magnesium oxide. ISIJ Int. 42, 685-693 (2002).
41. Yang, J. et al. Simultaneous desulfurization and deoxidation of molten steel with in situ produced magnesium vapor. ISIJ Int. 47, 418-426 (2007).
42. S. Capuzzi and G. Timelli, Met. 2018, Vol. 8, Page 249 8, 249 (2018).
43. ASM, *Properties and Selection: Nonferrous Alloys and Special Purpose Materials* (1990).
44. C. Stinn and A. Allanore, Nature (2021).
45. C. M. Hsiao and A. W. Schlechten, JOM 4, 65 (1952).
46. C. Stinn and A. Allanore, Metall. Mater. Trans. B 49, 3367 (2018).
47. H. Oyamada, T. Nagasaka, and M. Hino, Mater. Trans. JIM 39, 1225 (1998). P1 48. D. S. Kanibolotsky, O. A. Bieloborodova, N. V Kotova, and V. V Lisnyak, J. Therm. Anal. calorim. 70, 975 (2002).
49. A. I. Zaitsev, R. Y. Shimko, N. A. Arutyunyan, and S. F. Dunaev, Dokl. Phys. Chem. 414, 115 (2007).
50. H. L. Lukas, S. G. Fries, and B. Sundman, *Computational Thermodynamics: The Calphad Method* (Cambridge University Press, New York, NY, 2007).
51. H. H. Kellogg, Trans. Metall. Soc. AIME 236, 602 (1966).
52. F. Cverna, *Worldwide Guide to Equivalent Nonferrous Metals and Alloys* (ASM International, 2001). P1 53. X. J. Liu, I. Ohnuma, R. Kainuma, and K. Ishida, J. Phase Equilibria 1999 201 20, 45 (1999).
54. J. Faunce, U.S. Pat. No.$_{3,788,839}$A (1972).
55. T. S. Jones, in Miner. Yearb. (USGS, 1998).
56. Stinn, C., Toll, S., Allanore, A. (2022). *Aluminothermic Reduction of Sulfides via Reactive Vacuum Distillation*. In: Eskin, D. (eds) Light Metals 2022, pp 681-688. The Minerals, Metals & Materials Series. Springer, Cham. https://doi.org/10.1007/98-3-030-92529-1_89.
57. Firdaus, M., Rhamdhani, M. A., Durandet, Y., Rankin, W. J. & McGregor, K. Review of high-temperature recovery of rare earth (Nd/Dy) from magnet waste. *J. Sustain. Metall.* 2, 276-295 (2016).

SUMMARY OF VARIOUS EMBODIMENTS

In accordance with one embodiment, a method comprises dissolving a sulfide of a first metal in a solvent comprising molten aluminum; aluminothermically reduce at least a portion of the sulfide through reactive vacuum distillation to form gaseous aluminum sulfide distillate and elemental first metal that remains in the molten aluminum; and at least one of (e.g., one, two, or all three of) (a) reacting the aluminum sulfide distillate with at least one material in the molten aluminum; (b) reacting the aluminum sulfide distillate with at least one material outside of the molten aluminum; or (c) condensing the gaseous aluminum sulfide distillate.

In various alternative embodiments, the sulfide may not fully dissolve in the molten aluminum and at least a portion of the sulfide may be aluminothermically reduced at the interface of the sulfide and the molten aluminum through reactive vacuum distillation to form gaseous aluminum sulfide distillate and elemental first metal that remains in the molten aluminum. The process may produce an alloy comprising at least aluminum and the first metal. The process may further involve adding a third metal or compound of the third metal to the molten aluminum to produce an alloy including the third metal and at least one of aluminum or the first metal. The compound of the third metal may be aluminothermically or thermally reduced/decomposed prior to alloying. The process may further involve vacuum distillation of aluminum from an alloy of aluminum and at least one of the first metal or the third metal to enrich the alloy in at least one of the first metal or the third metal. The process may further involve recovering at least some of the first metal from the molten aluminum. The process may further involve oxidizing at least some of the first metal in the molten aluminum. The molten aluminum may include a mixture of the first metal sulfide and at least one oxide, in which case the process may extract the sulfide from the surrounding oxide via selective aluminothermic reduction of the sulfide. The molten aluminum may include at least one other element that forms at least one gaseous volatile sulfide that in turn assists the aluminum in reduction, in which case the process may selectively condense at least one of the at least one gaseous volatilized sulfide. The process of reacting the aluminum sulfide distillate with at least one material in the molten aluminum may involve reactive stripping or reactive absorption. The process may further involve aluminum sulfide distillate or at least one of the at least one gaseous volatized sulfides reacting with at least one element from an oxide to form a sulfide which may be aluminothermically reduced via reactive vacuum distillation. In any of these embodiments, the first metal sulfide that is dissolved in the solvent comprising molten aluminum may be formed by selectively sulfidizing the first metal. In an alternative embodiment, a sulfide of the third metal may be contacted with a sulfide of a fourth metal in the absence of aluminum, in which the sulfide of the third metal is thermally decomposed, producing an alloy of the third metal and some or all of the fourth metal.

In accordance with one embodiment, a method comprises selective aluminothermic leaching of a sulfide from a surrounding oxide without simultaneous reactive vacuum distillation.

In accordance with one embodiment, a method comprises the use of a slag or matte in contact with a sulfide reactant, metal product, or distillate, the slag or matte containing one or more metal oxides and/or metal chalcogenide and/or metal halide for controlling the partial pressure of dissolved impurities or distillate gasses.

In accordance with one embodiment, a system comprises a reactor or vessel in which any of the above methods are performed. The reactor or vessel may serve as an absorption substrate for reactive absorption.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 19 is a flow diagram encompassing various processes in accordance with example embodiments.

Figure 1:
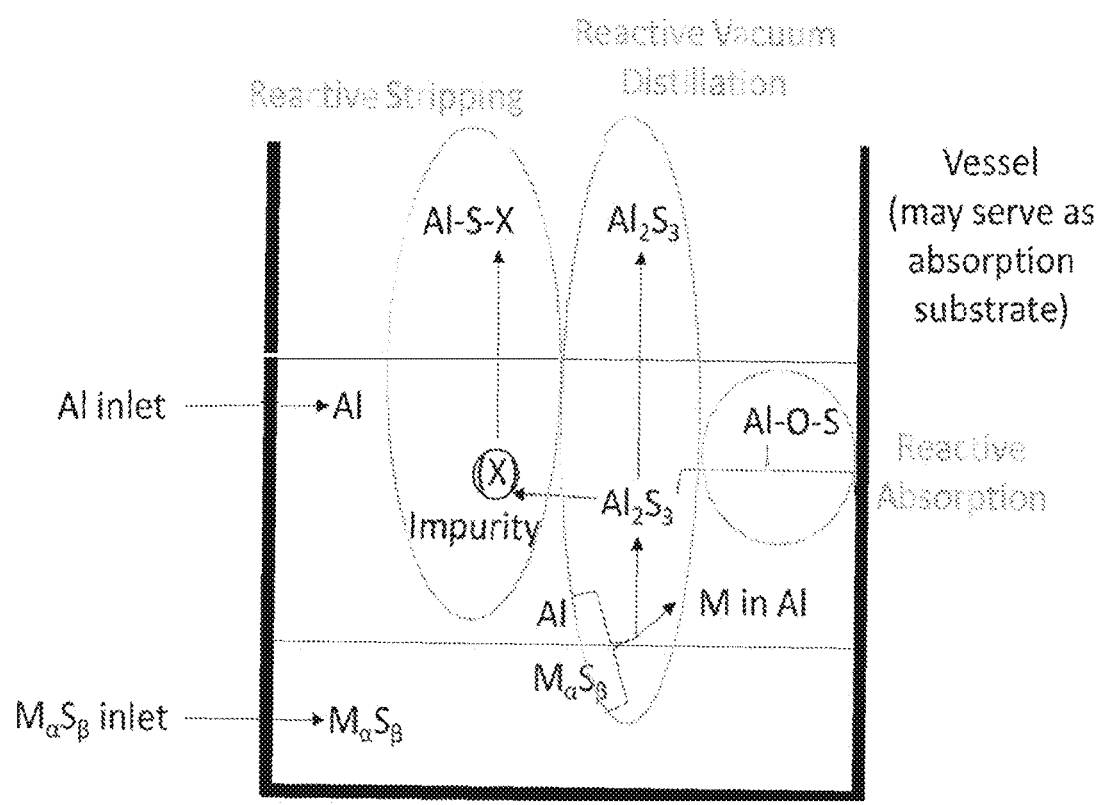
FIG. 1 is a simplified schematic diagram of our aluminothermic reactive vacuum distillation, absorption, stripping, and extraction process for aluminothermic reduction and refining of a metal sulfide ($M_\alpha S_\beta$) via simultaneous reactive vacuum distillation, reactive absorption, and reactive stripping, in accordance with various embodiments.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

While significant industrial precedence exists for alloy production via aluminothermic reduction, these processes have seen limited application to sulfides. To our knowledge, reactive vacuum distillation has not been attempted in the context sulfide reduction, nor has aluminothermic extraction been applied to selectively-sulfidized feedstocks. While reactive stripping is conventionally applied in refining processes, with magnesium as a stripping agent generated in situ via aluminothermic reduction, to our knowledge, the stripping agent has never been the product of the reduction of the master alloy component, nor has it been applied concurrently with reactive vacuum distillation. Similarly, to our knowledge, reactive absorption for impurity removal has also never been conducted concurrently with reactive vacuum distillation of sulfides for master alloy production.

We have invented an aluminothermic reactive vacuum distillation, absorption, stripping, and extraction (e.g., leaching) technology that is applicable to a wide assortment of metal and alloy production challenges such as impurity management, low production yields, master alloy production, metal recycling. This new technique lowers costs through process intensification and while improving environmental sustainability such as through the use of novel sulfide chemistries and in some cases lower energy requirements. Through process intensification, this technology increases the effectiveness of aluminothermic reduction while establishing methods to simultaneously manage a more convoluted impurity chemistry arising from the use of recycled, impure, or mineral-based feedstocks. This technology addresses sustainability concerns, economic bottlenecks, and emerging processing opportunities in a niche presently unfilled by other processing options and can be configured for metal production and refining for any number of commercial alloying elements, from either virgin or recycled feedstocks. Without limitation the following are some key innovations encompassed by this technology:

- Aluminothermic reduction of metal sulfides via reactive vacuum distillation
- Usage of aluminum for metallothermic reduction of alloys that previously required calciothermic or magnesiothermic reduction
- Integration of reactive vacuum distillation and reactive absorption into a single aluminothermic reduction process
- Selective aluminothermic extraction and reduction of sulfides from oxides in a single processing step, e.g., using aluminum as a liquid metal extractant while simultaneously serving as a reducing agent and refining agent for a wide range of materials chemistries and impurities, including metals, compounds, and alloys
- Reactive casting during reactive vacuum distillation, absorption, stripping, and extraction
- Aluminothermic production of a gas stripping agent via reactive vacuum distillation
- Integration of scrap refining and master alloy production into a single processing step
- Usage of lower purity feedstocks in metal and master alloy production, such as machining waste (swarf), recycled materials of known composition, dross from primary electrolytic production or recycling, recycled or synthesize master alloys (and or the waste from master alloy production), ores or mineral concentrates (sulfidized, selectively sulfidized, or natural), or even unsorted scrap as either the base metal solvent, alloy solute, or aluminum reductant source
- Integration of refining and reduction into a single processing step
- Production of a liquid metal extractant or collector phase via aluminothermic reduction and/or thermal decomposition of a sulfide compound Our aluminothermic reactive vacuum distillation, absorption, stripping, and extraction technology has been demonstrated for rare earth and transition metal aluminum and iron alloy production. These examples are representative of a wide range of challenges faced in both sulfide and recycled material feed processing.

Various embodiments provide an aluminothermic reactive vacuum distillation, absorption, stripping, and extraction technology for production of metals (M) and alloys from metal sulfides ($M_\alpha S_\beta$) via the following reaction, where $\alpha$ and $\beta$ are stoichiometric coefficients:

$$M_\alpha S_\beta + \frac{2\beta}{3}Al = \alpha M + \frac{\beta}{3}Al_2S_3 \qquad \text{(Eq. 1)}$$

While here aluminum sesquisulfide ($Al_2S_3$) is shown as the sulfide product, other stoichiometries of volatile aluminum sulfide compounds are possible based on the specific reactor conditions employed, including but not limited to AlS and $Al_2S$. Analysis herein based on $Al_2S_3$ may also be applied to other aluminum-sulfur compounds that may be generated from different feedstocks, reactor conditions or embodiments. Likewise, compounds with multiple cations or anions are also possible dependent on feedstock and impurity chemistry. Within the process, some or all of the following operations are conducted concurrently to result in the formation of high purity metal or alloy products:

Reactive vacuum distillation, in which aluminum-sulfur compounds are volatilized and evaporated from the system Reactive absorption, in which aluminum-sulfur compounds reacts with another condensed species and is thereby chemically depleted from the system Reactive stripping, in which gaseous aluminum-sulfur compounds react with dissolved impurities in the system, thereby refining the melt alongside the reduction process Aluminothermic reduction and/or thermal decomposition of a sulfide to produce a liquid metal extractant or collector phase that serves as a solvent for other metallic elements Reactive extraction, e.g., in which aluminum simultaneously and selectively leaches and reduces a target sulfide from a mixture of sulfides and/or oxides.

Reactive casting, in which solidification is induced during the reaction by one or more components exceeding their solubility limit Metal refining in the process of reduction, reactive absorption, reactive stripping, or reactive casting We believe that the simultaneous execution of reactive vacuum distillation, absorption, stripping, and/or extraction technologies facilitated by our technology is a novel step forward in metals processing via process intensification that facilitates the production of metals and alloys from natural or synthetic sulfide and impure recycling feedstocks.

FIG. 1 is a simplified schematic diagram of our aluminothermic reactive vacuum distillation, absorption, stripping, and extraction process for aluminothermic reduction and refining of a metal sulfide ($M_\alpha S_\beta$) via reactive vacuum distillation with simultaneous reactive absorption and/or reactive stripping that can accomplished within a single reactor or vessel, in accordance with various embodiments. While in this schematic $M_\alpha S_\beta$ is shown to be introduced and rest below aluminum in the vessel, the depicted distribution and chemistry of aluminum, metal sulfide, impurities, absorption substrates, and reaction products should not be taken as an all-inclusive representative of every scenario in which our technology may be applied. It should be noted that, concurrently, additional slag or matte phases can exist in the system that are not depicted here. More advanced aspects of our technology, including, without limitation, the contribution of stripping and/or absorption products to refining and reduction, one or more components exceeding their solubility limit thereby leading to solidification and reactive casting, and aluminothermic extraction of a mixed metal sulfide-oxide such as produced by selective sulfidation, are not depicted here, but are described in detail below.

Without limitation, our technology generally can be compared to conventional aluminothermic reduction of oxides as follows. Conventional aluminothermic reduction of a metal (M) oxide ($M_xO_y$) is described by the following reaction, where $\alpha$ and $\beta$ are stoichiometric coefficients:

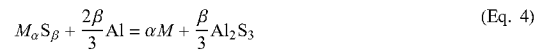

$$M_\alpha O_\beta + \frac{2\beta}{3} Al = \alpha M + \frac{\beta}{3} Al_2 O_3 \quad \text{(Eq. 2)}$$

As an example, in production of iron master alloys, iron serves as the solvent for M. Similarly, nickel, titanium, chromium, or other metals can serve as the solvent for M, depending on the type of master alloy. In in the production of aluminum master alloys, aluminum serves as both the reductant and the solvent. Aluminothermic reduction can sometimes also be used to produce high purity M. Typically, an immiscible liquid slag oxide phase is also present to serve as a collector for $Al_2O_3$, and is designed to help pull the reaction to completion through favorable interactions between $Al_2O_3$ and the slag phase. The thermodynamic purity of M in the alloy phase ($x_{M,A}$) is calculated as follows, where $\Delta_r G^\circ$ is the standard Gibbs energy of the reaction, R is the gas constant, T is the absolute temperature, x is the mole fraction of a species in a phase, where A denotes alloy and S denote slag, and $\gamma$ is the activity coefficient:

$$x_{M,A} = \sqrt[\alpha]{\frac{e^{\frac{-\Delta_r G^\circ}{RT}} \gamma_{M_\alpha O_\beta,S} x_{M_\alpha O_\beta,S} (\gamma_{Al,A} x_{Al,A})^{\frac{2\beta}{3}}}{\gamma_{M,A}{}^\alpha (\gamma_{Al_2O_3,S} x_{Al_2O_3,S})^{\frac{\beta}{3}}}} \quad \text{(Eq. 3)}$$

While each term contributes to determining the thermodynamically-predicted conversion of $M_\alpha O_\beta$ to M (and thereby the purity of M in the alloy phase), the main process parameter is $\gamma_{Al_2O_3,S} x_{Al_2O_3,S}$ (known as the activity of $Al_2O_3$ in the slag phase, $a_{Al_2O_3,S}$), which is dictated by the design of the slag phase itself. When the slag phase cannot be sufficiently engineered to achieve high enough purity of M in the alloy phase, a stronger reductant must be used (such as magnesium or calcium), thereby lowering $\Delta_r G^\circ$ and increasing $x_{M,A}$.

However, as discussed in the background section, recent literature has demonstrated that oxides are readily converted to sulfides via a plethora of sulfidizing agents, including $H_2S$, $CS_2$, and $S_2$. Aluminothermic reduction of a metal sulfide ($M_xS_y$) is described by a similar reaction:

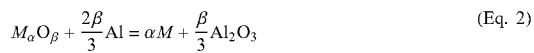

$$M_\alpha S_\beta + \frac{2\beta}{3} Al = \alpha M + \frac{\beta}{3} Al_2 S_3 \quad \text{(Eq. 4)}$$

While here aluminum sesquisulfide ($Al_2S_3$) is shown as the sulfide product, other aluminum sulfide stoichiometries are possible based on the specific reactor conditions employed, including but not limited to AlS and $Al_2S$. Analysis herein based on $Al_2S_3$ may also be applied to other aluminum-sulfur compounds that may be generated from different feedstocks, reactor conditions or embodiments. As for conventional aluminothermic reduction of an $M_\alpha O_\beta$, in aluminothermic reduction of $M_\alpha S_\beta$, iron, aluminum, nickel, titanium, chromium, or other metals may serve as solvents for M, or M may be produced as a high purity metal. Similarly, an immiscible matte phase (the sulfide-based corollary to a slag, denoted as m) could be designed to collect $Al_2S_3$ product and drive the reaction forward through favorable interactions between the matte and $Al_2S_3$. Unlike in conventional aluminothermic reduction, however, we observe $Al_2S_3$ to be a much more volatile and reactive product than $Al_2O_3$ while also exhibiting a much lower melting point (1100° C. vs 2100° C.), thereby permitting lower process temperatures and resultant energy savings in some cases.

Therefore, certain embodiments provide a reactive vacuum distillation process to accomplish the aluminothermic reduction of the sulfide while simultaneously boiling off and/or reacting $Al_2S_3$ or other aluminum-sulfur compounds, where now the conversion of the reaction, and thereby the metal thermodynamic purity in the alloy product ($x_{M,A}$), is controlled largely by the partial pressure of $P_{Al_2S_3}$ or other compounds containing aluminum and/or sulfur:

$$x_{M,A} = \sqrt[\alpha]{\frac{e^{\frac{-\Delta_r G^o}{RT}} \gamma_{M_\alpha S_\beta, m} x_{M_\alpha S_\beta, m} (\gamma_{Al,A} x_{Al,A})^{\frac{2\beta}{3}}}{\gamma_{M,A}{}^\alpha (P_{Al_2 S_3})^{\frac{\beta}{3}}}} \quad \text{(Eq. 5)}$$

Whereas mechanisms to control $a_{Al_2O_3,S}$ are largely limited to adding or removing components from the slag phase, numerous options are available to control partial pressures in our reactive vacuum distillation process, including, without limitation, changing the pressure of the system, adding or removing components from the gas phase, shifting the aluminum to sulfur ratio in the gas phase, adding or removing components from the matte phase, and/or reacting aluminum-sulfur species with either condensed or gaseous species, such as via a reactive absorption process. An example of control via a reactive absorption process is the formation of gaseous $Al_2S_3$ and its subsequent absorption onto and reaction with an oxide component in the system (for example, without limitation, either the container material or another added phase) to form an oxide or oxysulfide. A slag or matte phase consisting of one or more metal oxide, and/or metal chalcogenides, and/or metal halides may be used to set a sulfur, oxygen, aluminum sulfide, or aluminum oxysulfide gas partial pressure. Following aluminothermic reduction conducted via our technology, recovery and recycling of materials from the matte or slag phase may be accomplished via selective sulfidation or other chemical cracking methods. The availability of additional process control parameters in our reactive vacuum distillation process compared to conventional aluminothermic reduction of oxides allows aluminum to behave as a much more powerful reductant in the context of our invention than the conventional process, allowing metal alloys to be produced via aluminothermic reduction from their sulfides that would have required stronger, more expensive reductants such as calcium or magnesium in an oxide pathway. In the context of our invention, aluminum exhibits a different reducing power for oxides and sulfides. As has recently been shown (e.g., as described in the background section), sulfidation of oxides may be conducted selectively, resulting in physical mixtures of oxide and sulfide phases. Therefore, our technology can also be used to conduct selective aluminothermic extraction of a sulfide from a surrounding oxide. Under such conditions, extraction via selective aluminothermic reduction of the sulfide from the oxide in our invention could occur with or without simultaneous reactive vacuum distillation.

Figure 2:
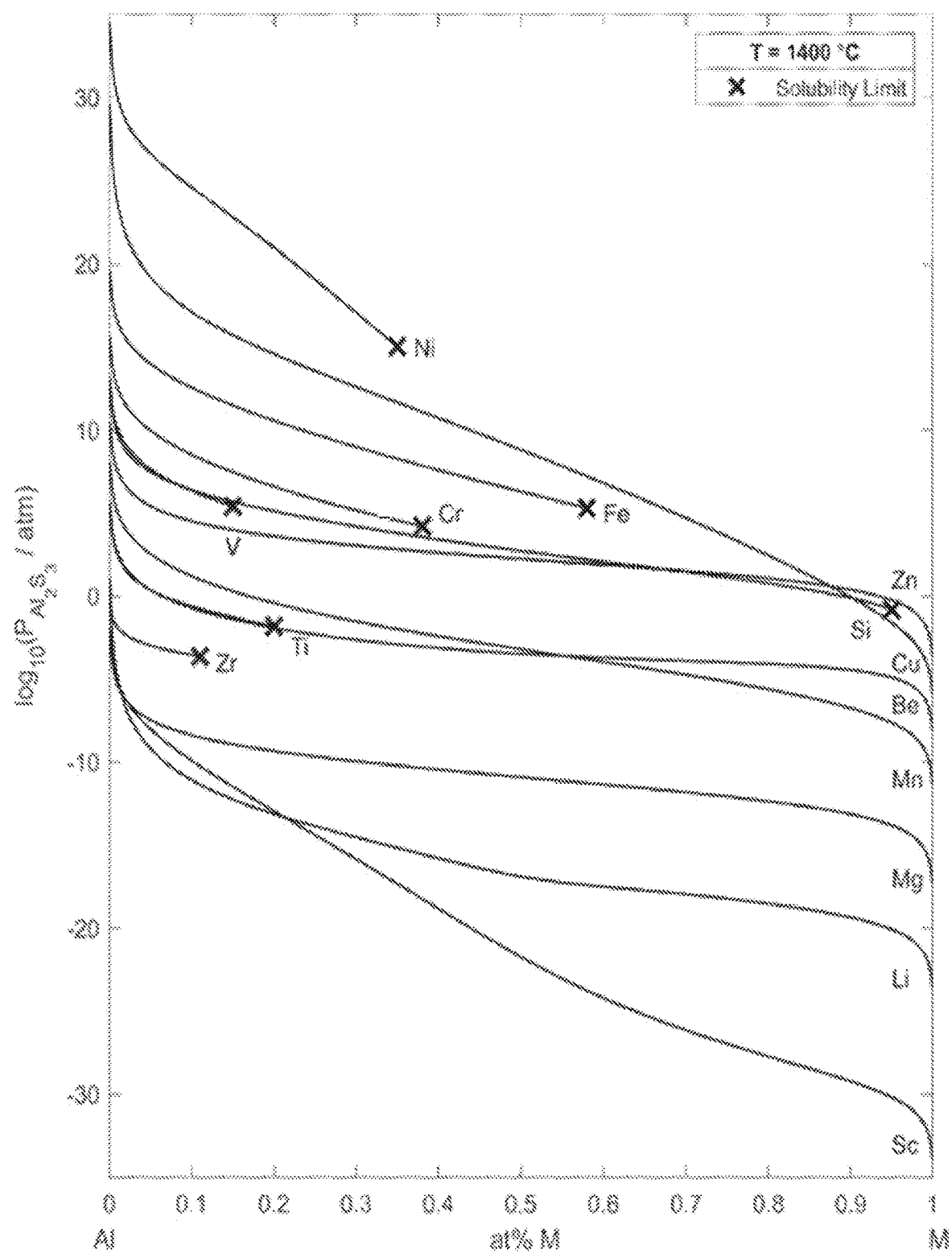
FIG. 2 shows thermodynamic purities achievable through our reactive vacuum distillation process, in the absence of matte chemistry, for some aluminum master alloys as a function of $P_{Al_2S_3}$, in accordance with various embodiments.

Tabulation of thermodynamic purities achievable through our reactive vacuum distillation process, in the absence of matte chemistry, for some aluminum master alloys are depicted as an example in FIG. 2 as a function of $P_{Al_2S_3}$. Similar relations may be determined for the master alloys of other metals, including but not limited to those of iron, nickel, titanium, and chromium, as well as for other alloying elements, with or without including matte and/or slag chemistry. Likewise, relations may be determined for other aluminum sulfide compound stoichiometries. Upon aluminothermic reduction of the solute alloying component into the solvent base metal, based on the phase stability of the system, the solubility limit of the alloying solute in the base metal solvent may be reached and exceeded, ultimately leading to solidification. In such a scenario, aluminothermic reduction via reactive vacuum distillation, reactive absorption, and/or reactive stripping also can embody a reactive casting process. A reactive casting process in accordance with certain embodiments is useful for suppressing the reactivity of base metals that are classically difficult to cast due to their reactivity, such as titanium. In such a scenario, our technology stabilizes the reaction interface and solidification front via a buffering interaction between aluminum sulfide, impurities in the system, and solutes/impurities expelled by the solidification front, via reactive absorption and stripping processes. Therefore, reactive casting as facilitated by our technology can manage and refine impurities that contribute to porosity and inclusions in as-cast ingots.

When our invented process is operated under conditions where $Al_2S_3$ and/or other compounds composed of aluminum and sulfur are volatilizing from the melt as a gas, due to its reactivity, product $Al_2S_3$ and/or other compounds composed of aluminum and/or sulfur may serve as a reactive stripping agent for other impurities in the system. Such impurities may arrive from the metal sulfide feed or the aluminum-based reductant. As an example, in processing streams with excessive levels of oxygen, as often occurs in sulfidized or recycled feedstocks, product $Al_2S_3$ from aluminothermic reduction may react with dissolved oxygen in the system to form oxides or oxysulfides. Similar reactions may occur between $Al_2S_3$ and excess alloying agents or impurities such as carbon, hydrogen, halides, pnictogens, chalcogenides, or even excess sulfur present in either the sulfide or reductant feed. As such, our technology affords management of nonmetal impurities in master alloy production, in particular for systems containing reactive or carbide forming solutes or solvents, with titanium, tantalum, niobium, vanadium, chromium, zirconium and rare earth elements serving as notable examples.

Without being limited to any theory, in master alloy production via aluminothermic reduction of a metal sulfide from aluminum in a system with metallic impurities, via our reactive vacuum distillation technology, the aluminothermic reduction of the sulfide occurs at the $Al$-$M_\alpha S_\beta$ interface to produce aluminum sulfide. Gaseous aluminum sulfide may then react with other metallic impurities at or away from the reaction interface, as it bubbles through the melt. Such a scenario is useful in systems where $M_\alpha S_\beta$ is in a separate part of the melt from either an impurity-rich region or a separate matte phase, with gaseous aluminum sulfide serving as a mass transport link between the regions or phases. Under such a scenario, aluminum reductant fed into the system can take the form of virgin metal, aluminum machining waste (swarf), recycled aluminum of known composition, dross from primary electrolytic production or recycling, recycled or synthesized master alloys (and or the waste from master alloy production), aluminum-containing oxides or minerals, or even unsorted aluminum scrap (including paints, enamels, and other coatings), amongst other sources, with both metallic and or nonmetallic impurities present in the feed. A mix of aluminum sources is a tenable reductant for use in various embodiments. Similarly, sulfide, base metal solvent, or alloy solute may take the form of machining waste (swarf), recycled materials of known composition, dross from primary electrolytic production or recycling, recycled or synthesize master alloys (and or the waste from master alloy production), ores or mineral concentrates (sulfidized, selectively sulfidized, or natural), or even unsorted scrap, amongst other sources. One or more additional metals may be added to the system or produced in situ via thermal decomposition of metal sulfide compounds for alloying with aluminum and/or with the base metal of the metal sulfide such as to form a master alloy.

In some instances, impurities themselves can aid in the reduction. As an example, feeds of aluminum, its master alloys, and/or its scrap often contains reactive metallic elements such as silicon, which upon sulfidation form sulfides with comparable volatility to $Al_2S_3$. Under such a scenario, silicon (or other metallic elements forming volatile sulfides, including but not limited to gallium, indium, boron, bismuth, and barium) may actually assist aluminum in reduction via reactive vacuum distillation, absorption, stripping, and extraction. Mixed, volatilized sulfides may be selectively condensed from one another, supporting separating and refining of gaseous production from the reactive vacuum distillation. Assisted aluminothermic reduction as practiced through our technology is particularly viable for synthesis of reactive metals, their alloys, and compounds, with titanium, tantalum, niobium, vanadium, chromium, zirconium and rare earth elements serving as notable candidates both as solutes and solvents. In such a scenario, metallic impurities are refined from the system during our reactive vacuum distillation, absorption, stripping, and extraction technology, while also having the potential to simultaneously refine other impurities and aid in reduction.

As an alternative example, dissolved nonmetallic impurities including but not limited to hydrogen, carbon, sulfur, and phosphorous are often present in materials processing feeds. These nonmetallic impurities can react with other components in the melt, or aluminum sulfide, to form sulfidizing agents such as hydrogen sulfide, carbon disulfide, and carbonyl sulfide, or other reactive species such as phosphorous oxide, phosphorous sulfide, or carbon monoxide, any or all of which may serve as alternative reactive stripping agents, perform in situ sulfidation (alongside $Al_2S_3$) for feedstock preparation within the reactor/processing pathway/metallurgical facility, or serve as a gaseous reductant assisting aluminothermic reduction. In such a scenario, nonmetallic impurities are refined from the system during our reactive vacuum distillation, absorption, stripping, and extraction technology, while also having the potential to simultaneously refine other impurities and aid in reduction.

Overall, our technology facilitates aluminothermic reduction of sulfides and refining via reactive vacuum distillation, extraction, reactive absorption, and reactive stripping. Conventionally, all of these processing steps would occur as separate events, often in separate reactors or vessels. Our technology allows these unit operations to be combined into a single processing step consisting of integrated extraction, reduction, and refining. The process intensification afforded by our technology simultaneously serves to increase the reducing power of aluminum, alleviating the need for stronger, more expensive reducing agents such as magnesium and calcium. Our technology is better suited to handle impurities than conventional processing, while in some cases the presence of impurities themselves even aid in reduction and refining in our technology.

Experimental Demonstration

To experimentally demonstrate our technology for aluminothermic reduction of sulfides and refining via reactive vacuum distillation, extraction, reactive absorption, and reactive stripping according to the following reaction, a representative chemistry was selected to serve as a proof on concept for controlling $P_{Al_2S_3}$:

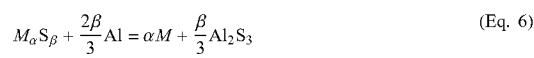

(Eq. 6)

While here aluminum sesquisulfide ($Al_2S_3$) is shown as the sulfide product, other aluminum sulfide stoichiometries are possible based on the specific reactor conditions employed, including but not limited to AlS and $Al_2S$. FIG. 2 shows an aluminothermic reduction series of some metal sulfides at 1400° C. as a function of aluminum alloy composition and $P_{Al_2S_3}$, with solubility limits depicted. Reviewing FIG. 2 in the context of aluminum master alloy production as an example, aluminothermic reduction of rare earth (Ln) sulfides such as scandium requires among the lowest $P_{Al_2S_3}$ for the reaction to proceed. Industrially-relevant aluminum master alloy examples that are represented by this framework include but are not limited to aluminum alloys of antimony, beryllium, bismuth, boron, calcium, cerium, chromium, cobalt, copper, copper-phosphorous, dysprosium, erbium, gadolinium, gallium, germanium, hafnium, indium, iron, lanthanum, lithium, magnesium, magnesium-boron, magnesium-silicon, manganese, nickel, niobium, molybdenum, praseodymium, scandium, silicon, silicon-calcium, silicon-iron, silicon-strontium, silver strontium, strontium-titanium-boron, tantalum, terbium, titanium, titanium-boron, titanium-carbon, tungsten, ytterbium, yttrium, vanadium, zinc, or zirconium. A similar exercise may be conducted for application of our technology to other base metals and solvents, including but not limited to alloys and master alloys of steel, stainless steel, nickel, titanium, and chromium. Furthermore, $P_{Al_2S_3}$ required for aluminothermic reduction of rare earth sulfides (~$10^{-9}$ atm for a 5% Al-Ln alloy) is below the levels of vacuum employed for vacuum degassing in metallurgical industries (~$10^{-3}$ atm). Therefore, aluminothermic reduction of rare earth sulfides using our technology illustrates simultaneous reactive vacuum distillation and reactive absorption of $Al_2S_3$ as methods to lower $P_{Al_2S_3}$ to critical levels for the reaction to occur.

To demonstrate aluminothermic reduction of rare earth sulfides to produce rare earth-aluminum master alloys using our technology, two sets of experiments were conducted. The first set of experiments consisted of aluminothermic reduction tests of scandium sulfide ($Sc_2S_3$) in three crucibles of equivalent geometry and dimensions but different materials—alumina ($Al_2O_3$), boron nitride (BN), and graphite. In each crucible, the reaction between 1.75 g of aluminum and 0.35 g of $Sc_2S_3$ was conducted at 1475° C. in a resistance heating furnace under a vacuum of $10^{-2}$ atm for two hours. As shown in FIG. 2, $P_{Al_2S_3}$ at the level of vacuum in the experiment is not low enough to drive the reaction via reactive vacuum distillation alone at these temperatures—other methods of $P_{Al_2S_3}$ removal must also be present, such as reactive absorption. The $Al_2O_3$ and BN are reactive with $Al_2S_3$ and $Sc_2S_3$, serving as case studies for aluminothermic reduction via concurrent reactive vacuum distillation and reactive absorption of $Al_2S_3$. Meanwhile, graphite stabilizes sulfides, thereby providing a scenario for aluminothermic reduction in the absence of reactive absorption.

Formation of $Al_3Sc$ metal was observed in the $Al_2O_3$ crucible, along with the formation of aluminum scandium oxysulfides. Formation of $Al_3Sc$ metal was also observed in the BN crucible, along with scandium borides and borosulfide byproducts. In the graphite crucible, $Sc_2S_3$ was reduced to ScS, but little $Al_3Sc$ was observed at this temperature. Increasing the temperature above 1500° C. increased the rate of aluminothermic reduction of scandium sulfides to metal in the presence of graphite. Outside the crucibles, sulfur/sulfide deposits were observed to condense, illustrating that reactive vacuum distillation had occurred. These results confirm that our technology of an integrated reactive vacuum distillation and reactive absorption process is able to reach the low levels of $P_{Al_2S_3}$ required for aluminothermic reduction of $Sc_2S_3$.

Figure 3:
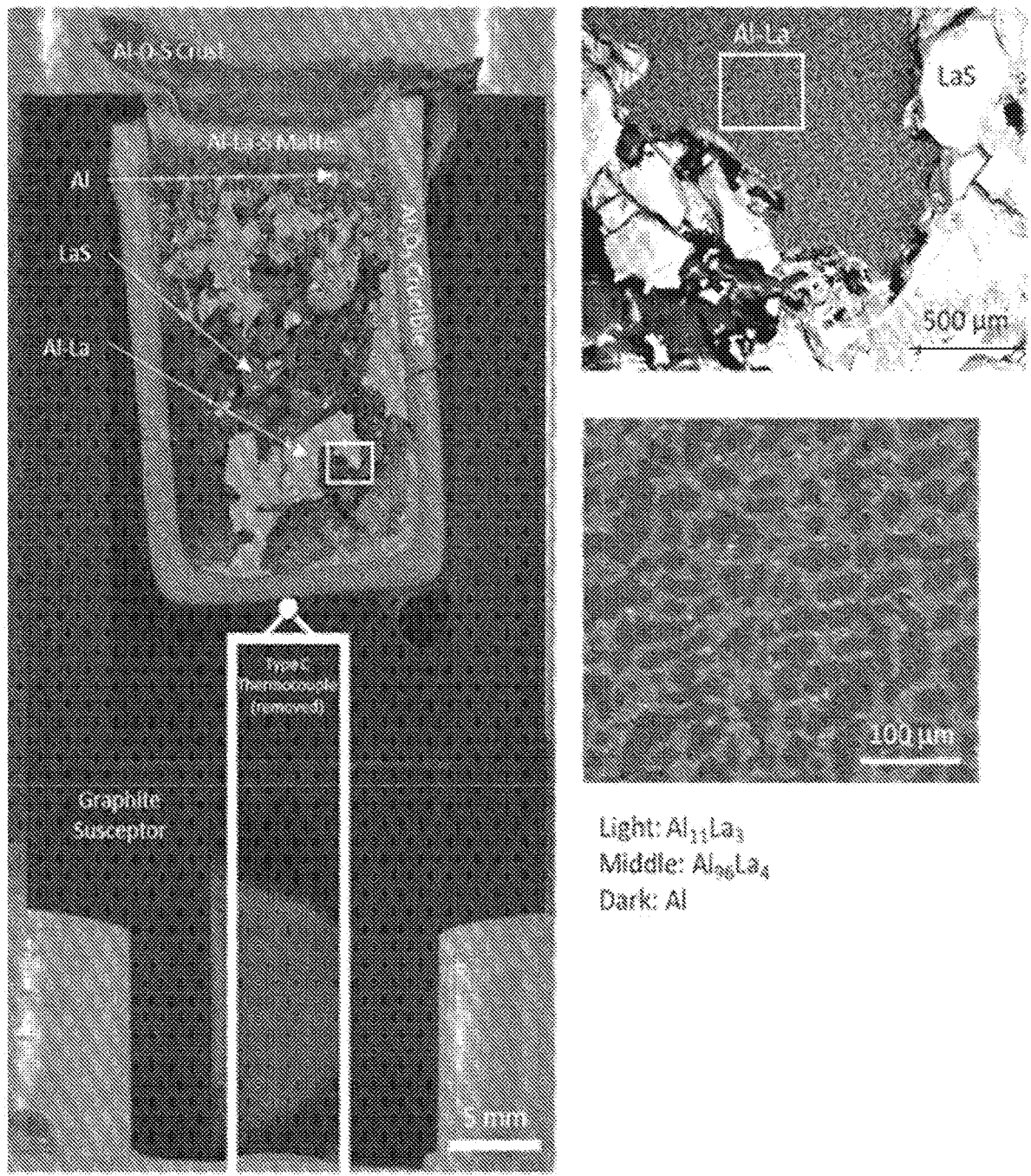
FIG. 3 shows a cross section of aluminothermic reduction test of lanthanum sulfide, revealing the formation of an aluminum oxysulfide crust, aluminum lanthanum sulfide matte, and aluminum-lanthanum metal alloy during the experiment, in accordance with one specific exemplary embodiment.

The second experiment consisted of the aluminothermic reduction of LaS in an $Al_2O_3$ crucible in a graphite susceptor at 1550° C. in an induction furnace under a vacuum of $10^{-2}$ atm for two hours. LaS was premelted and crushed to 1-2 mm in size prior to aluminothermic reduction. After two hours of aluminothermic reduction via reactive vacuum distillation, the entire crucible was quenched in order to observe the distribution of phases that were present during the reaction. FIG. 3 shows a cross section of aluminothermic reduction test of lanthanum sulfide, revealing the formation of an aluminum oxysulfide crust, aluminum lanthanum sulfide matte, and aluminum-lanthanum metal alloy during the experiment. Within the melt, a dispersion existed of LaS and aluminum particle sizes ranging from microns to millimeters, illustrating that aluminum was actively extraction and breaking up the 1-2 mm sized LaS particles. During the experiment, a crust containing aluminum oxysulfide was observed to condense above the $Al_2O_3$ crucible on the graphite susceptor, with the formation of an aluminum-lanthanum sulfide matte between the crust and melt below. The condensation of the oxygen containing crust above the crucible is indicative of reactive stripping of oxygen from the system, carried away via an $Al_2S_3$ stripping agent produced in-situ via reactive vacuum distillation.

At the interface between the matte and the melt, significant $Al_2S_3$ remained in the system, and as a result, $P_{Al_2S_3}$ was locally too high for reduction to occur. Aluminum-lanthanum metal alloy lower in the crucible away from the crust was produced at an approximate lanthanum content of 4 at %, which solidified as a mixture of lanthanum saturated aluminum metal, lanthanum super-saturated aluminum metal, and $Al_{11}La_3$ intermetallic compound upon quenching (FIG. 3).

Figure 4:
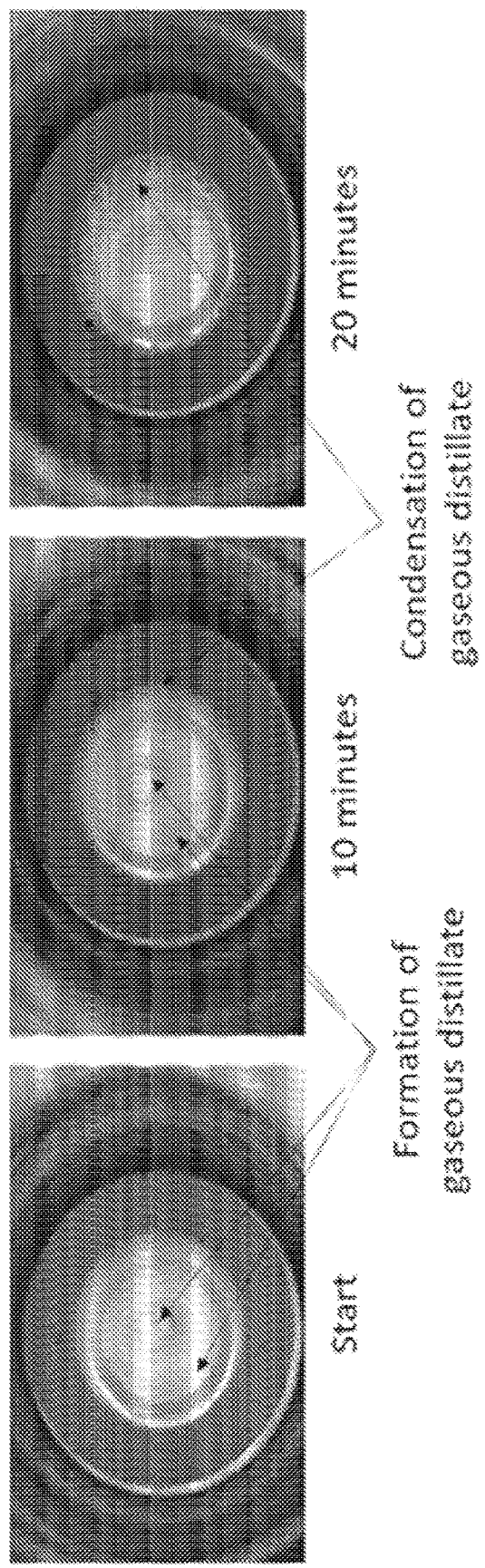
FIG. 4 shows views of aluminothermic reduction of manganese sulfide via reactive vacuum distillation at the start of the reaction and after ten and twenty minutes, revealing the formation of a gaseous distillate at the top of the melt and its subsequent condensation on the wall of the susceptor, in accordance with one specific exemplary embodiment.

An additional experiment was performed following the methodology above for aluminothermic reduction of a transition metal sulfide, here manganese sulfide. In an aluminum oxide crucible held within a graphite susceptor, the reaction between manganese sulfide at a particle size of 300 mesh and aluminum metal was conducted at 1375° C. under a vacuum of $10^{-2}$ atm for half an hour. During the experiment, boiling of aluminum sulfide/oxysulfide was observed (FIG. 4). At the conclusion of the experiment, manganese sulfide had fully aluminothermically reduced in the crucible, resulting in a metal alloy product of approximately 10 at % manganese, 90 at % aluminum (FIG. 5), consisting of a mixture of aluminum metal saturated with manganese and aluminum-manganese intermetallic metal alloy of approximately 20 at % manganese. The sulfur content of the aluminum-manganese metal alloy product was found to be less than 0.1%, below the detectable limit of the analytical methods employed. The manganese composition of the final product in this example was not limited by $P_{Al_2S_3}$, but by the amount of manganese sulfide initially present at the start of the experiment.

Figure 5:
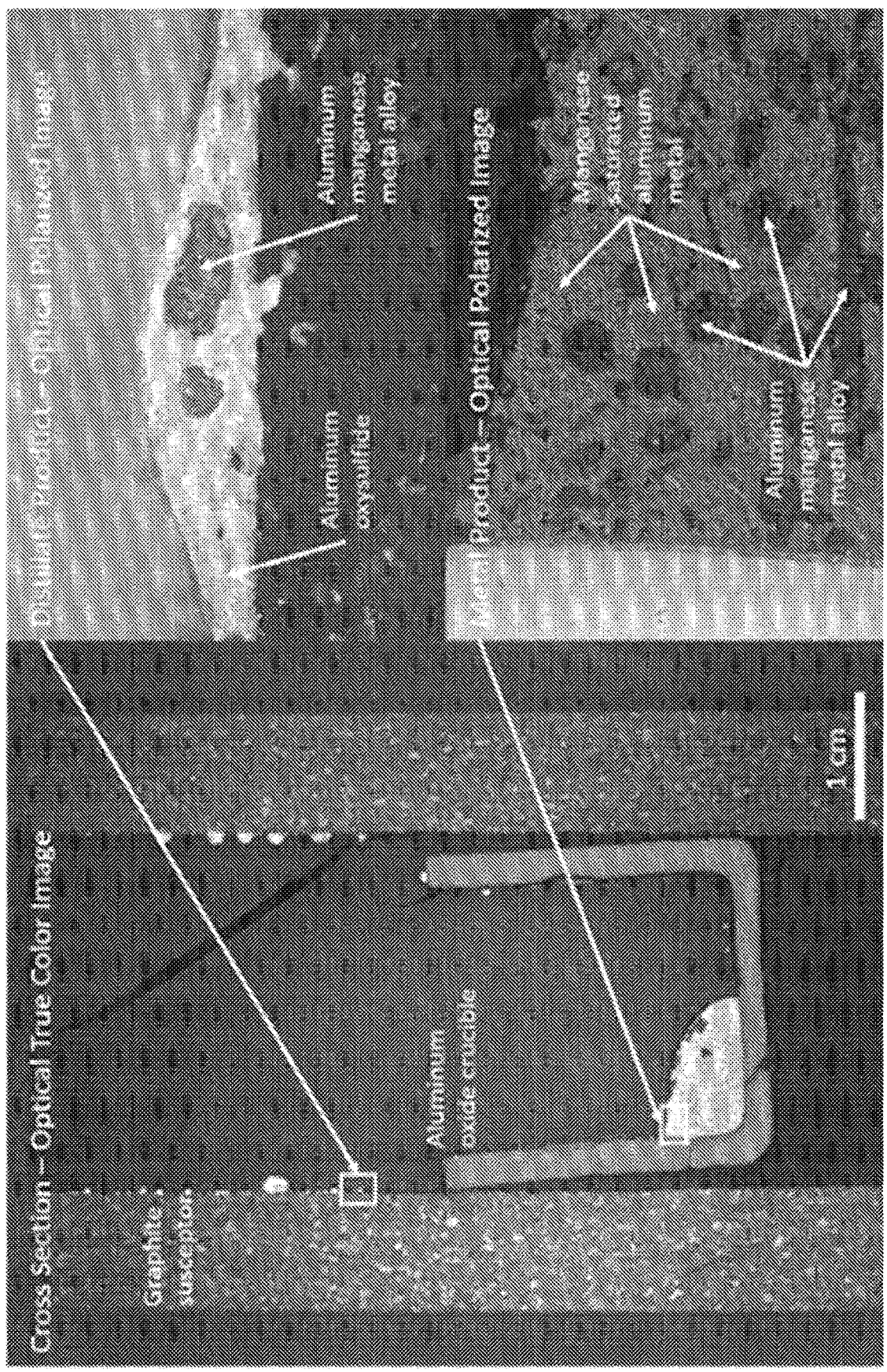
FIG. 5 shows a cross section of aluminothermic reduction test of manganese sulfide, revealing the formation of manganese aluminum metallic alloy metal product and condensed aluminum oxysulfide distillate, in accordance with one specific exemplary embodiment.

Above the aluminum oxide crucible on the wall of the graphite susceptor, aluminum oxysulfide distillate condensed on the wall of the susceptor, with the aluminum oxysulfide distillate formed via the reactive absorption and/or the reactive stripping reaction between aluminum sulfide distillate and the aluminum oxide crucible or dissolved oxygen in the melt. Some aluminum-manganese metallic alloy was observed to be entrained with the distillate, or may have volatized from the melt following reaction and deposited on the wall of the susceptor (FIG. 5). The sulfur content of the aluminum-manganese metal alloy product deposited on the wall of the susceptor was found to be higher than the sulfur content of the aluminum-manganese metal alloy product in the crucible, illustrating that refining of sulfur impurities from the crucible aluminum-manganese metal product occurred in parallel with aluminothermic reduction.

Taken together, these sets of experiments showcase the applicability of our technology to difficult, industrially-relevant metal processing challenges. In summary, we show that aluminothermic reduction can be accomplished via reactive vacuum distillation and reactive absorption for rare earths, among the most stable metal sulfides, demonstrating that our technology is a metal-agnostic processing technology for master alloy production from metal sulfides. In metallothermic reduction technologies such as ours, the metal solvent often serves as the reductant, which we illustrate in the extraction of lanthanum from and breakup of larger LaS particles. However, because our process causes aluminum to exhibit different strengths as a reducing agent between oxides and sulfides, aluminum exists as a much more selective solvent in the extraction of sulfides from oxides than in conventional processing of oxides alone, and therefore is applicable to many challenging materials separations, such as separation of transition metal elements from rare earth elements and separation of individual rare earth elements. Furthermore, through the reactive stripping of oxygen via an $Al_2S_3$ stripping agent produced in situ via reactive vacuum distillation, we demonstrated that our technology can integrate reduction and refining technologies into a single, novel processing step. The ability to reduce and refine in a single processing step, as developed through our technology, facilitates the use of scrap metals directly in master alloy production that generally would have contained too many impurities for direct reintroduction to metal processing pathways.

Additional experimental demonstrations of aluminothermic reduction of metal sulfide via the methods of our invention can be described, including but not limited to those that follow. Aluminothermic reduction of a metal sulfide via the methods of our invention to produce aluminum metal alloys of antimony, beryllium, bismuth, boron, calcium, cerium, chromium, cobalt, copper, copper-phosphorous, dysprosium, erbium, gadolinium, gallium, germanium, hafnium, indium, iron, lanthanum, lithium, magnesium, magnesium-boron, magnesium-silicon, manganese, nickel, niobium, molybdenum, praseodymium, scandium, silicon, silicon-calcium, silicon-iron, silicon-strontium, silver strontium, strontium-titanium-boron, tantalum, terbium, titanium, titanium-boron, titanium-carbon, tungsten, ytterbium, yttrium, vanadium, zinc, or zirconium may be conducted, where product purity may be hypothesized as a function of $P_{Al_2S_3}$ and solution thermodynamics at the conditions of the reaction. Similarly, aluminothermic reduction of titanium and vanadium sulfide to produce titanium-vanadium-aluminum alloy via the methods of our invention is hypothesized. Aluminothermic reduction of niobium sulfide and iron sulfide to produce ferroniobium via the methods of our invention is hypothesized. Aluminothermic reduction of iron sulfide from a mixture of iron sulfide and rare earth oxide/oxysulfides to produce an iron-aluminum alloy and a rare earth slag/matte phase via the methods of our invention is hypothesized.

For example, the following demonstrates the production of a 10 wt % manganese master alloy via aluminothermic reduction of manganese sulfide, with a manganese yield of over 95% [56].

As suggested above, master alloys for aluminum serve as a source of alloying elements that are essential to tailoring the metal to its many end uses, ranging from automotive to aerospace to structural applications. Presently, aluminum master alloy production is complicated by challenges ranging from high emissions and costs to low yields and productivities. While master alloys are typically produced from oxide, halide, or metallic feedstocks, sulfide chemistry provides a new opportunity to reduce economic and environmental costs via process intensification and increased yields. Herein, we explore the production of aluminum master alloys from sulfide feedstocks through aluminothermic reduction via reactive vacuum distillation. We present a thermodynamic framework to elucidate the behavior of aluminum as a reductant for sulfides, focusing on volatility and gas atmosphere. We demonstrate the production of a 10 wt % manganese master alloy via aluminothermic reduction of manganese sulfide, with a manganese yield of over 95%. Our thermodynamic and experimental results suggest that aluminothermic reduction of sulfides is a possible new route for the production of aluminum master alloys.

Growing concerns surrounding emissions in the metallurgy sector, coupled with rising mining costs associated with widespread depletion of accessible high value metal ore bodies, are presently motivating an industry-wide review of the optimal chemistries for economical and sustainable metal production in the $21^{st}$ century [1-9]. Concurrently, recycling of metallic elements has become increasingly cumbersome due to ever more-complicated material applications, resulting in many convoluted waste streams unsuitable for recycling by the standard process of melting scrap and reintroducing it with new material in the primary production pathway [42]. Furthermore, high costs, as well as increasing supply uncertainty for critical metallic elements due to geographic concentration of metal production infrastructure, pressures metal alloy producers to aim for higher product yields per unit of material processed [14]. Taken together, these changing industry circumstances present a grim outlook for the supply chain of many conventional alloying elements for aluminum products.

Aluminum alloys remain the most commonly used metals after steel, and are ubiquitous across aerospace, automotive, structural, and consumer applications. The distinct mechanical properties of different aluminum alloys can be traced back to their alloying elements. The major alloying element in 2XXX, 3XXX, 4XXX, 5XXX, 6XXX, and 7XXX alloys are copper, manganese, silicon, magnesium, magnesium-silicon, and zinc respectively, with minor alloying elements including boron, beryllium, chromium, iron, scandium, titanium, vanadium, and zirconium, as well as many others [43]. In these alloys, the base metal aluminum serves as a solvent for the other alloying element solutes. Production of aluminum alloys, from both freshly mined ores as well as from recycled materials, necessitates the careful introduction of required solute alloying elements to and removal of undesired elements from the aluminum solvent. Element addition is generally accomplished through dissolving solute compounds rich in the alloying element, called master alloys, into the molten aluminum solvent.

Master alloys for aluminum are often produced via coreduction of the alloying element and aluminum via electrowinning, or metallothermic reduction in the presence of an aluminum source. A multitude of examples of coreduction for master alloy production via electrowinning exist, notably molten salt electrolysis for aluminum-scandium, aluminum-zirconium, aluminum-silicon, and aluminum-boron from mixed oxides and halides [18]. Examples of metallothermic reduction of oxides for master alloy production are also prevalent, including aluminum-scandium production via calciothermic reduction of their mixed oxides [24], and aluminum-neodymium and aluminum-silicon production via aluminothermic reduction of the oxide in the presence of excess aluminum [25,26]. In other cases, master alloys are produced via mixing the pure elements, such as for aluminum-manganese and aluminum-titanium master alloys. However, master alloy production from these pure metals and others is often problematic due to poor mixing of the components and the loss of alloying elements from volatization and oxidation [27,29].

Master alloy production is almost exclusively conducted using oxide or halide chemistries. Nevertheless, the economic and environmental benefits [6,34] of metal production from sulfides have recently attracted significant attention, motivating a wave of technologies to convert oxides to sulfides for subsequent reduction. Examples include reaction with elemental sulfur, carbon disulfide, or hydrogen sulfide to produce numerous rare earth and transition metal sulfides relevant for metal alloy production [3,8,44]. These new sulfide feedstocks require new metal reduction technologies, which have presently focused on electrowinning from sulfide electrolytes or calciothermic reduction via FFC-Cambridge-style electrometallurgical processes [3,5-7]. However, sulfide-based chemistries have not been extensively utilized for aluminum master alloy production, despite predicted economic and environmental benefits [6,34]. A promising, yet so-far unexplored, method for aluminum alloy production is aluminothermic reduction of metal sulfides ($M_\omega S_\psi$) to produce aluminum alloys and aluminum sulfide byproduct (here denoted as the sesquisulfide $Al_2S_3$, yet other stoichiometries are possible), where $\omega$, $\psi$, and $\phi$ are stoichiometric coefficients:

(Eq. 7)
$$M_\omega S_\psi + \phi Al_{(solvent)} = \omega M_{(solute)} + \frac{3\phi - 2\psi}{3} Al_{(solvent)} + \frac{\psi}{3} Al_2S_3$$

By le Chatelier's principle, the conversion of a sulfide to metal via aluminothermic reduction reaction (Eq. 7) may be increased using a reactor open to aluminum sulfide, i.e., where aluminum sulfide can be continuously removed from the system. Thanks to the high volatility of the aluminum sulfide byproduct under pyrometallurgical conditions, reactive distillation is expected to facilitate high yield aluminothermic reduction processes for master alloy production from sulfide feedstocks. Process intensification can then be realized by integrating metal reduction (1) and alloying of the produced metal M with Al into a single unit operation. Following master alloy production, byproduct aluminum sulfide can be calcined into alumina for reduction via the Hall-Heroult process, or directly reduced, in order to close the material balance on aluminum.

We explore such aluminothermic reduction via reactive vacuum distillation to obtain aluminum master alloys from sulfide feedstocks. We consider the vaporization thermodynamics of metal sulfides and aluminum master alloys, which motivate the use of a reactive distillation process. We further analyze the sensitivity of the aluminothermic reduction thermodynamics of metal sulfides with respect to gas atmosphere and alloy solution chemistry, revealing that conversion of metal sulfides to aluminum alloy may be improved under vacuum conditions. We then evaluate a proof of concept for aluminum-manganese master alloy production using aluminothermic reduction of the respective sulfide via reactive vacuum distillation, comparing the yield in metal and purity of the product with current processes and specifications.

In terms of thermodynamic framework, aluminothermic reduction of metal sulfides for aluminum alloy production (Eq. 7) necessitates an understanding of their thermal stabilities under pyrometallurgical conditions. Some master alloys for aluminum, such as those of manganese, are produced with low yields due to high volatility and oxidation of the pure metal alloying component [27,29]. Meanwhile, numerous metal sulfides exhibit moderate vapor pressures under pyrometallurgical conditions [45]. To maximize master alloy yields from the aluminothermic reduction of sulfides, controlling the volatility of sulfide feedstocks and alloy products is critical. The monatomic vaporization of a condensed phase metal (M) may be described by the following reaction:

$$M_{(s,l)} = M_{(g)} \quad \text{(Eq. 8)}$$

At equilibrium with a reference state temperature of 25° C. and reference state pressure of 1 atm, for an ideal gas and incompressible condensed phase, the partial vapor pressure of the metal ($p^{vap}_M$) may be described as a function of the standard Gibbs energy of Eq. 8 ($\Delta r\, G°_{(2)}$), the gas constant (R), the absolute temperature (T), the activity coefficient of the metal in the condensed phase ($\gamma_M$), and the mole fraction of the metal in the condensed phase ($x_M$):

$$P^{vap}_M = \gamma_M x_M e^{\frac{-\Delta_r G°_{(2)}}{RT}} \quad \text{(Eq. 9)}$$

Figure 6:
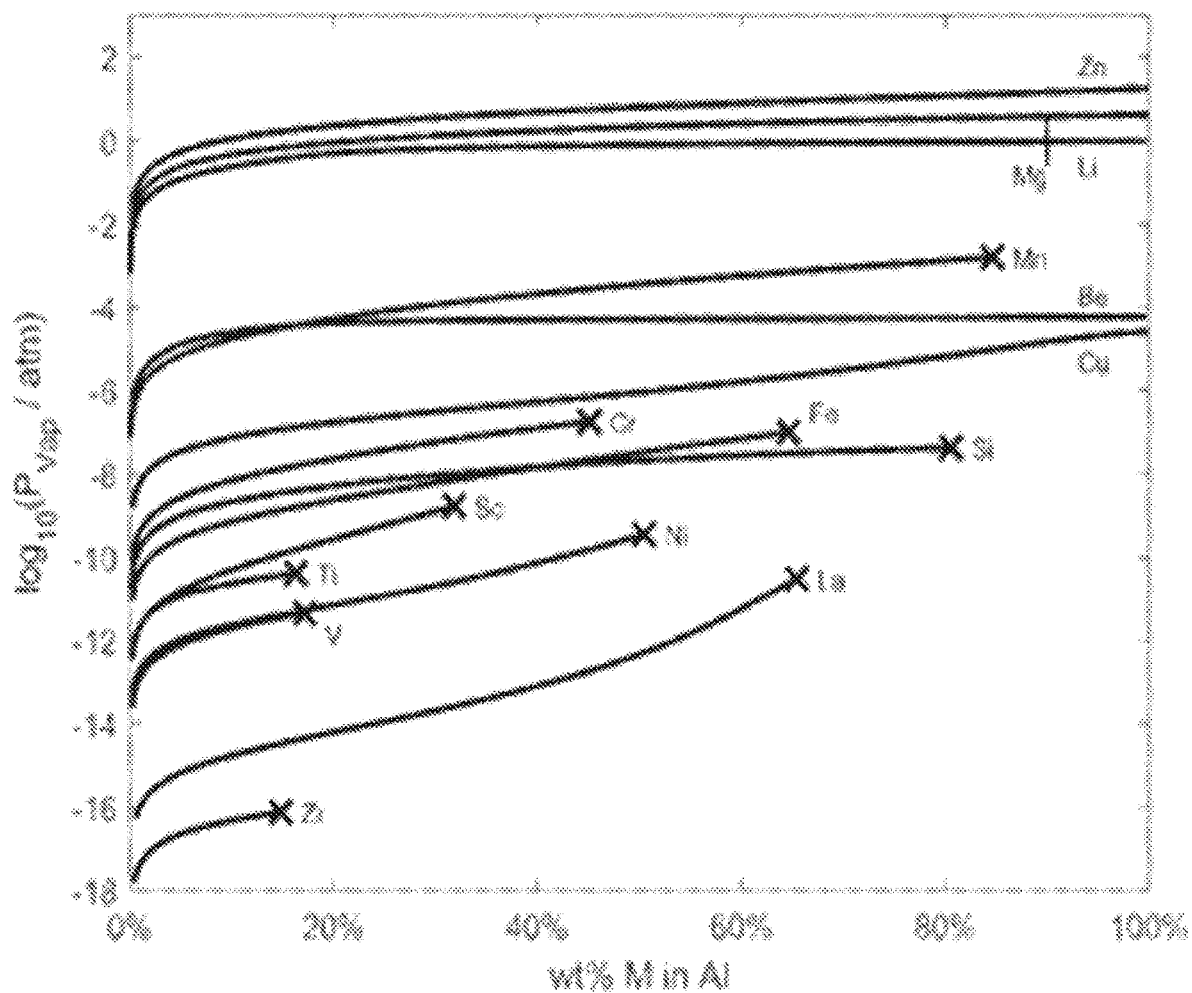
FIG. 6 shows the partial vapor pressures of different alloying elements in liquid binary aluminum alloys up to the solubility limit (X) at 1300° C. in accordance with certain embodiments.

For metal species that exist as diatomic or complex vapors, similar relations to Equations 8-9 may be developed. Table 1 depicts calculated pure metal ($\gamma_M x_M = 1$) vapor pressures at 1300° C. for alloying elements commonly utilized in the aluminum industry. For vaporization of a metal from an alloy, $\gamma_M$ is described by the solution thermodynamics of the system, which may be measured experimentally [46-49] or estimated via computational methods [50]. Here, mixing thermodynamics for aluminum binary alloys are calculated using the FactSage 8.0 FTlite database. In FIG. 6, the partial vapor pressures of different alloying elements in liquid binary aluminum alloys at 1300° C. are presented as functions of composition up to the alloying element solubility limit (X) in liquid aluminum at that temperature. From Raoult's law ($\gamma_M = 1$), at more dilute alloy compositions the partial vapor pressure of alloying elements decreases. The relative strengths of adhesive versus cohesive forces in the liquid alloy leads to positive ($\gamma_M > 1$) or negative ($\gamma_M < 1$) deviations from Raoultian behavior, corresponding to positive or negative excess partial vapor pressures respectively versus the ideal partial vapor pressure predicted from Table 1 and Raoult's law. For systems free of azeotropes, the thermodynamic driving force for undesirable vaporization of alloying components is minimized when both reduction and alloying are conducted simultaneously in the same processing step. This is different than their alloying by simple melting and mixing of the pure components.

Concurrently, the vaporization and/or decomposition of a metal sulfide ($M_\omega S_\psi$) may be described by the following reaction, where $\omega$, $\psi$, $\phi$, $\nu$, $\tau$, $\sigma$, $\rho$, and $\xi$ are stoichiometric coefficients:

$$M_\omega S_{\psi(s,l)} = \phi M_\nu S_{\tau(s,l)} + \frac{\omega - \phi\nu}{\rho} M_\rho S_{\xi(g)} + \frac{\psi\rho - \phi\nu\rho - \omega - \phi\nu}{2\rho} S_{2(g)} \quad \text{(Eq. 10)}$$

The evaporation behaviors of metal sulfides are notoriously complex, arising from their tendency to disassociate and evolve sulfur upon vaporization or thermal decomposition, resulting in the use of an "apparent" vapor pressure that includes gas evolution from both phenomena [45]. Due to differences in the reaction stoichiometry and the number of moles of gaseous species, the minimum Gibbs energy of the evaporation/decomposition reaction in Eq. 10 may not necessarily correspond to the maximum apparent vapor pressure for the sulfide. Furthermore, multi-anion and multi-cation vapor species are known for many metal sulfide compounds [51]. For aluminum and its major alloying components, the vapor or decomposition pressures of their pure sulfides are estimated following a similar methodology to Equation 3, using the FactSage 8.0 FactPS database and Trouton's rule. Estimates of apparent sulfide vapor pressure ($p^{vap}_{M-S}$) are included in Table 1 alongside the vapor pressure of the pure metal.

TABLE 1

The vapor pressure at 1300° C. of some aluminum alloying elements as metals and sulfides.

| Metal | $P^{vap}_M$/atm | Sulfide | $P^{vap}_{M-S}$/atm |
|---|---|---|---|
| Al(l) = Al(g) | 4.1E−05 | $Al_2S_3$(l) = $Al_2S_3$(g) | 2.7E−01 |
| Si(s) = Si(g) | 5.5E−08 | SiS(S) = SiS(g) | 4.7E−01 |
| Mn(l) = Mn(g) | 2.6E−03 | MnS(s) = Mn(g) + $0.5S_2$(g) | 2.8E−06 |
| Mg(l) = Mg(g) | 4.3E+00 | MgS(s) = Mg(g) + $0.5S_2$(g) | 5.4E−06 |
| Ti(s) = Ti(g) | 5.7E−09 | TiS(s) = Ti(g) + $0.5S_2$(g) | 1.1E−10 |
| Fe(s) = Fe(g) | 7.2E−07 | FeS(l) = Fe(s) + $0.5S_2$(g) | 2.2E−05 |
| Cu(l) = Cu(g) | 2.6E−05 | $Cu_2S$(l) = 2Cu(g) + $0.5S_2$(g) | 1.8E−05 |
| Zn(l) = Zn(g) | 1.8E+01 | ZnS(s) = Zn(g) + $0.5S_2$(g) | 2.0E−02 |
| V(s) = V(g) | 4.8E−10 | VS(s) = V(g) + $0.5S_2$(g) | 1.3E−09 |
| Zr(s) = Zr(g) | 1.1E−13 | $ZrS_2$(S) = ZrS(g) + $0.5S_2$(g) | 1.5E−12 |
| Sc(s) = Sc(g) | 3.0E−06 | ScS(s) = Sc(g) + $0.5S_2$(g) | 1.2E−12 |
| Li(s) = Li(g) | 1.0E+00 | $Li2_s$(l) = 2Li(g) + $0.5S_2$(g) | 3.6E−05 |
| Ni(s) = Ni(g) | 2.5E−07 | $Ni_3S_2$(l) = 3Ni(g) + $S_2$(g) | 2.3E−05 |
| Cr(s) = Cr(g) | 1.7E−06 | CrS(s) = Cr(g) + $0.5S_2$(g) | 1.1E−06 |
| Be(l) = Be(g) | 6.0E−05 | BeS(s) = Be(g) + $0.5S_2$(g) | 2.3E−07 |
| La(l) = La(g) | 1.5E−08 | LaS(s) = LaS(g) | 1.1E−11 |

As shown in Table 1, aluminum sulfide is not thermodynamically predicted to decompose upon vaporization, and it exhibits a higher vapor pressure at 1300° C. than the metals and sulfides of most aluminum alloying elements. Consequently, aluminum sulfide product may be selectively distilled from a system containing metal sulfide reactants or metal alloy products that exhibit greater thermal stability, shifting equilibrium towards the product side of Eq. 7 following le Chatelier's principle. Under conditions where aluminum sulfide is formed as a gaseous product, Eq. 7 may be rewritten as follows, where co and are stoichiometric coefficients:

$$M_\omega S_\psi + \frac{2\psi}{3} Al_{(solvent)} = \omega M_{(solute)} + \frac{\psi}{3} Al_2 S_{3(g)} \quad \text{(Eq. 11)}$$

At thermodynamic equilibrium, the mole fraction of metal ($x_M$) in a binary aluminum alloy produced via aluminothermic reduction of a pure, immiscible metal sulfide may be described by the following equation, where $\Delta r\, G°_{(5)}$ is the standard Gibbs energy of the reaction in Eq. 11, $P_{Al_2S_3}$ is the partial pressure of aluminum sulfide, $x_{Al}$ is the mole fraction of aluminum in the alloy phase, and $\gamma_{Al}$ and $\gamma_M$ are the activity coefficients of aluminum and the alloying element respectively in the binary alloy, calculated for a given binary liquid alloy composition using the FactSage 8.0 FTlite database:

$$x_M = \omega \sqrt{\frac{e^{\frac{-\Delta_r G^\circ_{(5)}}{RT}} \gamma_{Al}^{\frac{2\psi}{3}} x_{Al}^{\frac{2\psi}{3}}}{\gamma_M^\omega P_{Al_2S_3}^{\frac{\psi}{3}}}} \qquad \text{(Eq. 12)}$$

Figure 7:
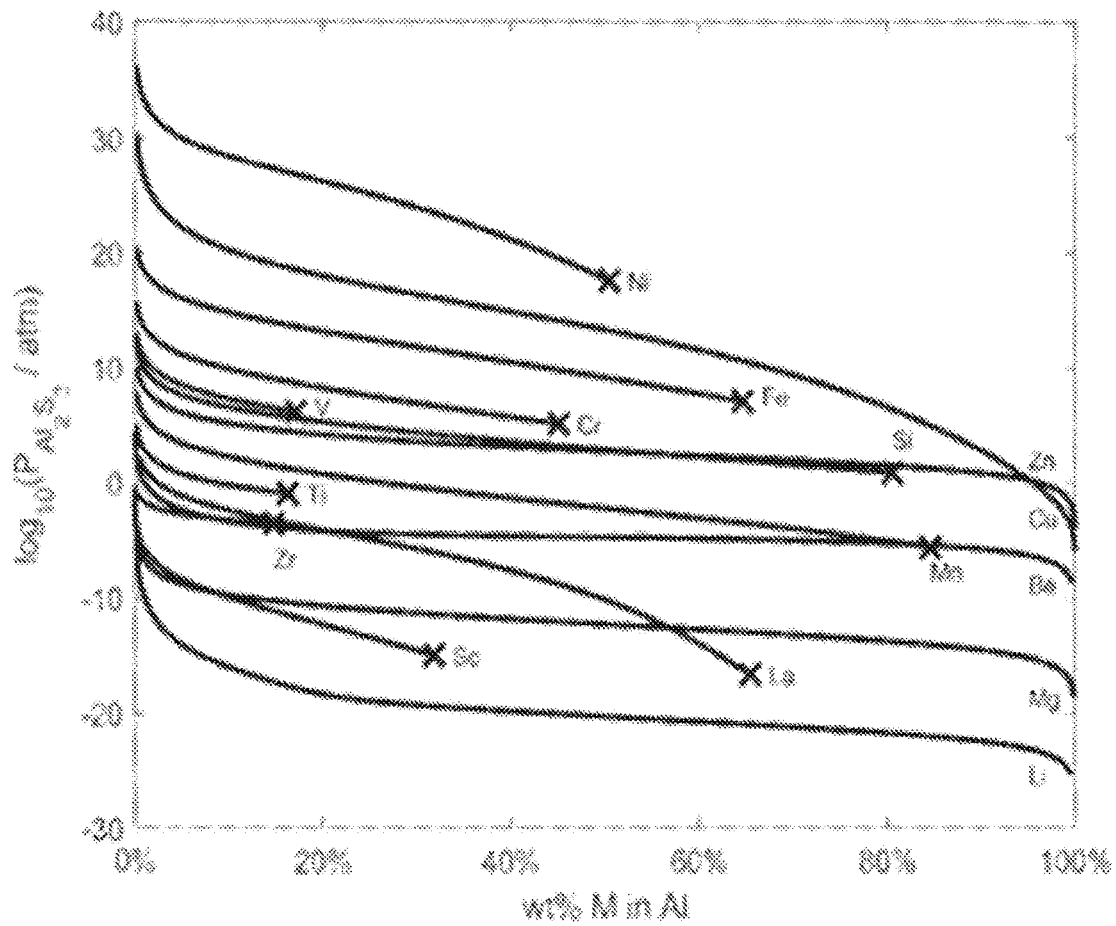
FIG. 7 shows critical aluminum sulfide partial pressure required for aluminothermic reduction of a sulfide to produce a binary aluminum alloy up to the alloy's solubility limit (X) at 1300° C. in accordance with certain embodiments.

From Eq. 12, a critical aluminum sulfide partial pressure ($[P_{Al_2S_3}]_{crit}$) may be defined to achieve a target alloy composition as a function of temperature and solution behavior, which is depicted in FIG. 7 for some aluminum master alloy binary systems at 1300° C. across the liquid alloy composition range up to the alloying element solubility limit. Similar analysis may be conducted for aluminum sulfide products of other stoichiometries. The equilibrium of Eq. 11 may be shifted toward the products by purging aluminum sulfide from the system. As shown in Table 1 and FIG. 6, aluminum sulfide exhibits high volatility compared to the sulfide reactants and alloy products for most aluminum alloying elements. If the liquid binary alloy product and sulfide reactant are assumed to be incompressible and non-volatile with respect to aluminum sulfide, the $[P_{Al_2S_3}]_{crit}$ required to reach a particular conversion following Eq. 7 and Eq. 11 may be met by conducting the reaction under partial vacuum, thereby expunging aluminum sulfide from the system via distillation.

We now demonstrate aluminothermic reduction of manganese sulfide for aluminum master alloy production via reactive vacuum distillation. In terms of experimental methods, aluminothermic reduction of manganese sulfide in the presence of excess aluminum may be described by the following reaction:

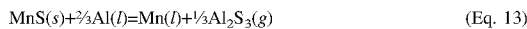

$$\text{MnS}(s) + \tfrac{2}{3}\text{Al}(l) = \text{Mn}(l) + \tfrac{1}{3}\text{Al}_2\text{S}_3(g) \qquad \text{(Eq. 13)}$$

For aluminothermic reduction, manganese sulfide (MnS, 99.9% metals basis, 325 mesh, Lot #F27Z033, Alfa Aesar) and aluminum metal (Al, 99.7% trace metals basis, <1mm, Lot #MKCB1152V, Aldrich) were utilized as feedstocks in a mass ratio of 0.171, corresponding stoichiometrically to a predicted alloy product composition of 10 wt % manganese and 90 wt % aluminum, within the specifications of AlMn10 master alloy (9-11 wt % Mn, EN AM-92500, EN AM-92501 [52]). Reduction was facilitated via reactive vacuum distillation, which was conducted in an induction tube furnace (UltraFlex UPT M35/150, HS-35/150, coil ID: 100 mm, coil height: 100 mm). A graphite crucible (OD: 45 mm, ID: 28 mm, height: 85 mm, depth: 75 mm, isostatically pressed, EC-12/AC-12, Tokai Carbon) machined in-house was used as the susceptor, with a hole (10 mm diameter) drilled through the center of the bottom to serve as a thermocouple input. Within the graphite susceptor crucible, an inner crucible (OD: 28 mm, ID: 26 mm, height: 27 mm, depth: 25 mm) made from either alumina ($Al_2O_3$, CoorsTek) or graphite (machined in-house, isostatically pressed, EC-12/AC-12, Tokai Carbon) held the manganese sulfide and aluminum feedstocks. Total feedstock masses on the order of 4 g and 8 g were utilized in the alumina and graphite inner crucibles respectively.

Manganese sulfide was loaded into the inner crucible first, with the aluminum metal placed on top of the manganese sulfide. During the experiment, the temperature of the feedstock was monitored using a type-C thermocouple in direct contact with the bottom of the inner crucible, introduced through the hole in the bottom of the graphite susceptor crucible. The susceptor crucible was supported on a quartz tube (OD: 25 mm, ID: 22 mm, height: 300 mm, Technical Glass Products), and held within the center of a quartz furnace tube (OD: 50 mm, ID: 46 mm, height: 600 mm, Technical Glass Products) with vacuum fittings (ISO KF50, McMaster Carr) on each end. The furnace tube was positioned so that the susceptor crucible was aligned in the center of the induction coil.

Once the furnace tube containing the susceptor crucible, quartz support tube, inner crucible, type-C thermocouple, and feedstock was loaded into the induction furnace coil, the furnace tube was evacuated to a pressure of 10 -3 atm and re-purged with argon (99.95%, UHP300, Airgas). After the evacuation/argon purge cycle was completed three times, the furnace tube was evacuated a final time to a vacuum of $10^{-3}$ atm, and heating was commenced. The inner crucible was heated to a temperature of 1300° C. over the course of 10 minutes while under vacuum. As shown in Table 1 and FIG. 6, at 1300 ° C. under a vacuum of $10^{-3}$ atm, aluminum sulfide is predicted to boil, while manganese alloyed in aluminum metal and manganese sulfide are both comparatively non-volatile.

Therefore, at a pressure of $10^{-3}$ atm, aluminum sulfides are expected to be the dominant gaseous species. According to FIG. 7, a $P_{Al_2S_3}$ of $10^{-3}$ atm is sufficiently low for aluminothermic reduction of manganese sulfide. The feedstock was thus held at 1300° C. for 35 minutes while under vacuum, during which the aluminothermic reduction of manganese sulfide occurred. After 35 minutes had passed, power to the furnace was shut off and the sample was allowed to cool.

Following cooling, the furnace tube was refilled with argon to atmospheric pressure, after which the graphite susceptor, inner crucible, and aluminum alloy reaction product were removed and cast as one unit in epoxy, oriented in the same manner with respect to one another as they had been during the reaction. After the epoxy solidified, the cast sample containing the graphite susceptor, inner crucible, and reaction product was cross sectioned through the center along the vertical axis, then ground flat and polished. Following grinding and polishing, the composition of the aluminum alloy product was quantified via SEM/EDS analysis (SEM: JEOL JSM-6610LV, JEOL Ltd., EDS: Sirius SD detector, SGX Sensortech Ltd.).

Figure 8:
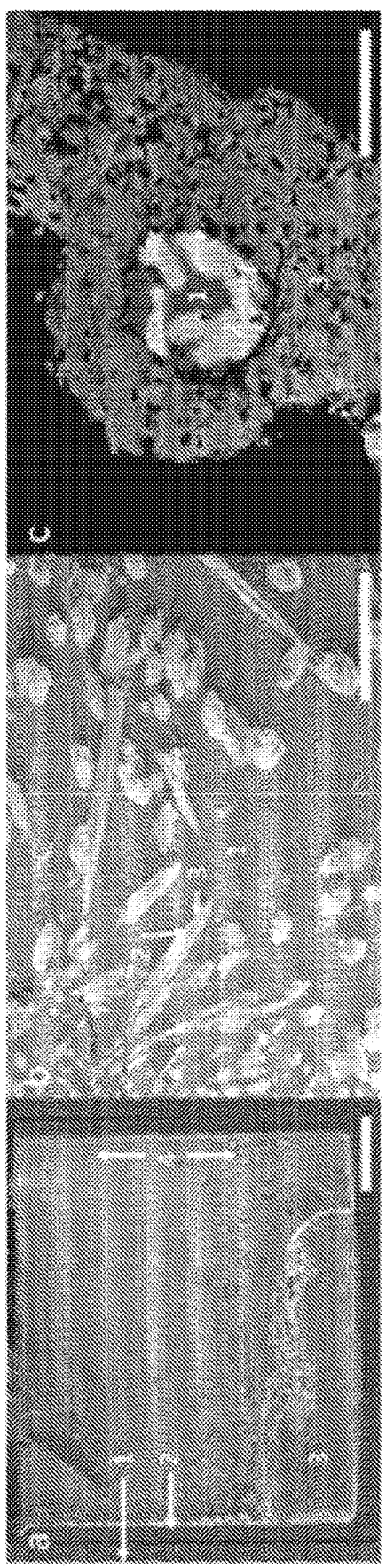
FIG. 8 shows distribution of product phases following aluminothermic reduction of manganese sulfide via reactive vacuum distillation in accordance with one embodiment.

As a result, aluminothermic reduction of manganese sulfide was conducted via reactive vacuum distillation (Eq. 13), with a cross section of the epoxy cast susceptor crucible, graphite inner crucible, and products depicted in FIG. 8. As shown in FIG. 8, three distinct product regions are visible following reactive vacuum distillation: the metal product that remained within the inner crucible at the bottom, the sulfide distillate that condensed and formed a coating on the upper walls of the inner crucible and graphite susceptor, and a small quantity of dispersed metal distillate that condensed on the upper walls of the inner crucible and graphite susceptor as droplets on the order of 10-500 microns in size alongside the sulfide distillate. Specifically, panel (a) of FIG. 8 is an optical image of the cross section of the graphite susceptor (1) and inner graphite crucible (2) containing the aluminum manganese metal alloy product (3) in the bottom of the inner crucible, with distillate (4) deposited on the crucible wall above the alloy product (here, the scale bar corresponds to 5 mm). Panel (b) of FIG. 8 is an SEM/BEC image of the bottom metal alloy product, with the dark gray phase (1) identified as Al, the intermediate gray phase (2) identified as $MnAl_6$, and the light gray phase identified as $MnAl_{4.17}$ (here, the scale bar corresponds to 600 μm). Panel (c) is an SEM/BEC image of the distillate products, with dark gray (1) and light gray phases identified as aluminum-rich and manganese rich metal alloy distillate products respectively, and the intermediate gray phase (3) identified as a sulfide distillate product (herein the scale bar corresponds to 30 μm). Within the metal product found at the bottom, three phases are observed via SEM/EDS, corresponding to aluminum metal and two aluminum-manganese intermetallic alloys. The same product regions and phases were also observed when reduction was conducted using an alumina inner crucible. The compositions of the bottom and distillate phases are presented in Table 2.

TABLE 2

Average composition and standard deviation (SD) of manganese-aluminum master alloy products.

| Crucible Material | Region | Phase | Mn wt % | Mn SD | S wt % | S SD | Al wt % | Al SD |
|---|---|---|---|---|---|---|---|---|
| Graphite | Bottom | Bulk Metal | 10.1% | 0.7% | 0.2% | 0.2% | 89.7% | 0.9% |
|  | Bottom | Al | 1.5% | 0.3% | 0.1% | 0.1% | 98.4% | 0.7% |
|  | Bottom | $MnAl_6$ | 22.0% | 0.6% | 0.1% | 0.1% | 78.0% | 0.7% |
|  | Bottom | $MnAl_{4.17}$ | 27.6% | 1.3% | 0.2% | 0.1% | 72.2% | 0.6% |
|  | Distillate | Bulk Metal | 13.9% | 1.4% | na | na | 86.1% | 2.2% |
|  | Distillate | Sulfide | 2.2% | 0.3% | 59.6% | 0.6% | 38.2% | 0.5% |
| Alumina | Bottom | Bulk Metal | 8.5% | 0.4% | 0.2% | 0.2% | 91.3% | 0.7% |
|  | Distillate | Bulk Metal | 14.4% | 2.2% | 2.4% | 0.8% | 83.2% | 2.4% |

The bottom metal alloy product from the graphite inner crucible was found to exhibit bulk manganese and aluminum contents of 10.1 wt % and 89.7 wt % respectively, consistent with specifications for AlMn10 master alloys. Therefore, aluminothermic reduction of sulfides via reactive vacuum distillation can support the production of aluminum master alloys in a single processing step that simultaneously encompasses both reduction and alloying, as we demonstrate here for aluminum-manganese. Aluminum sulfide was formed as a distillate byproduct of the aluminothermic reduction reaction and may be recycled via direct reduction or calcined to alumina and reduced via the conventional Hall-Heroult process. While sulfur impurity content was observed to be on the order of 0-0.4 wt %, SEM/EDS analysis was unable to determine if the sulfur content was below the maximum of 0.04-0.05 wt % specified for AlMn10 grade aluminum-manganese master alloys [52]. Analytical techniques more sensitive for quantification of sulfur, such as LECO, may be used to pinpoint the exact sulfur content of the master alloy product. The bulk bottom metal product is observed to be made up of two aluminum alloy phases that were precipitated out of the aluminum solution upon solidifying (FIG. 8, panel b), with manganese contents of 22.0 wt %, 27.6 wt %, and 1.5 wt % respectively. The manganese-rich alloy phases are taken to correspond to $MnAl_6$ and $MnAl_{4.17}$ precipitants in aluminum as charted in the phase diagram by Liu et al [53], with solubility for aluminum shifting the composition off stoichiometry. The sulfur contents of these three phases in the product are observed to be on the order of 0-0.2 wt %. This sulfur content is less than that observed in the average bulk composition, suggesting minor entrainment of sulfides dispersed in the metal product. The bulk composition of the bottom product was observed to be less manganese-rich at 8.5 wt % with marginally higher sulfur content at 0-0.5 wt % when an alumina inner crucible was employed instead of a carbon inner crucible. While it is possible that the presence of aluminum oxide in the system may affect the aluminothermic reduction reaction due to the formation of volatile oxysulfide species [51], further research is necessary to attribute the cause of the lower manganese and higher sulfur contents when an alumina inner crucible is used. Techniques such as LECO would be valuable to accurately quantify the presence of sulfur, oxygen, and carbon impurities in aluminum-manganese master alloy products. Meanwhile, crystalline phase analysis via XRD is warranted to better quantify the nature of these impurities.

Using the results of Table 2 and assuming a similar bulk sulfur content in the metal distillate product for both alumina and graphite inner crucibles, a mass balance may be conducted over manganese, aluminum, and sulfur in the system. Table 3 shows the fraction of manganese, aluminum, and sulfur that partitioned into each of the bottom metal, distillate metal, and distillate sulfide products, allowing for determination of aluminum-manganese master alloy yields.

TABLE 3

Distribution of manganese, aluminum, and sulfur between product phases.

| Crucible Material | Element | Bottoms Metal | Distillate Metal | Distillate Sulfide |
|---|---|---|---|---|
| Graphite | Mn | 95.7% | 2.2% | 2.1% |
|  | S | 3.1% | 0.6% | 96.3% |
|  | Al | 94.6% | 1.5% | 3.9% |
| Alumina | Mn | 66.2% | 31.9% | 1.9% |
|  | S | 3.1% | 9.1% | 87.8% |
|  | Al | 76.8% | 20.0% | 3.3% |

Since these experiments were conducted under vacuum, no slag phase was utilized. In an industrial-scale process, manganese losses to slag would also need to be considered. The extent of manganese loss to a slag phase is governed by the solution thermodynamics of manganese distribution between the slag and liquid alloy. A novel, aluminothermic reduction process for master alloy production via reactive vacuum distillation meanwhile presents an opportunity to design new slag phases that minimize the loss of alloying components.

For the system employing the alumina inner crucible, the direct yield of manganese into the bottom aluminum-manganese master alloy was 66.2%. In reality, the metal distillate product is readily separated from the sulfide distillate using magnetic separation or flotation, and therefore may be recycled through the aluminothermic reduction system. This provides a practical manganese yield in the aluminum-manganese master alloy of about 98.1%. Meanwhile, for the system employing the graphite inner crucible, the direct yield of manganese into the bottom aluminum-manganese master alloy was 95.7%, with a practical yield of about 97.9%. For comparison, a typical yield in industrial master alloy production by mixing pure aluminum with electrolytic manganese powder is of the order of 60% or lower [54]. In addition, the industrial production of electrolytic manganese has notoriously low efficiency and high energy usage and GHG emissions, with manganese yields on the order of 50-75% [55]. Therefore, the yield of manganese in the master alloy across both electrolytic reduction and alloying is on the order of only of 30-45%, leading to high costs per unit of manganese in the master alloy product. Herein instead, MnS would be sourced and introduced directly, which is achievable with lower costs and limited environmental impact using sulfidation such as put forth before.

Our experimental results therefore indicate that aluminothermic reduction of sulfides via reactive vacuum distillation is a potential alternative to produce aluminum masters at high yields and commercially-viable purities, while supporting process intensification by combining reduction and alloying into a single unit operation.

In conclusion, a desire to improve the environmental and economic sustainability of aluminum alloy processing motivates the search for low carbon technologies that can reduce costs. Aluminothermic reduction of sulfides for master alloy production is one such avenue, providing opportunities for process intensification and high aluminum alloy product yields. Herein, we establish a thermodynamic framework for the use of reactive vacuum distillation in aluminum master alloy production from sulfides. Due to the high volatility of aluminum sulfide compared to the metals and sulfides of many aluminum alloying elements, we find that the reducing power of aluminum for metal sulfides can be controlled through the application of vacuum. We successfully demonstrate 10 wt % manganese aluminum master alloy production (AlMn10) through aluminothermic reduction of manganese sulfide via reactive vacuum distillation, with a manganese alloy product yield of over 95%. Extending these results across the thermodynamic framework we establish, aluminothermic reduction of sulfides is a promising path forward for simplifying the production of other challenging master alloys, such as zirconium and scandium.

It should be noted that aluminothermic processing of the types described herein can be used in conjunction with a selective sulfidation process that can be used, for example, and without limitation, to produce metal sulfides for subsequent aluminothermic processing or to perform selective sulfidation on an aluminothermically produced material (e.g., following aluminothermic reduction conducted via our technology, recovery and recycling of materials from the matte or slag phase may be accomplished via selective sulfidation or other chemical cracking methods). Certain exemplary selective sulfidation processes that can be used in conjunction with certain embodiments are described in U.S. patent application Ser. No. 17/134,429 entitled SELECTIVE SULFIDATION AND DESULFIDATION filed Dec. 27, 2020, which claims the benefit of U.S. Provisional Patent Application No. 62/982,373 entitled SELECTIVE SULFIDATION AND DESULFIDATION filed Feb. 27, 2020, each of which is hereby incorporated herein by reference in its entirety. Thus, for example, various embodiments include the use of selective sulfidation as a precursor to and/or as a post-process for our aluminothermic technology.

For one example, the following demonstrates a framework for impurity stripping enabled by aluminothermic reduction via reactive vacuum distillation.

In general, aluminum to sulfur atomic ratios in the distillate vary greatly with aluminum sulfide partial pressure. The equilibrium between elemental aluminum, elemental sulfur, and aluminum sesquisulfide is described by the following reaction:

$$2Al(g) + 3/2 S_2(g) = Al_2S_3(g) \qquad \text{(Eq. 14)}$$

Figure 9:
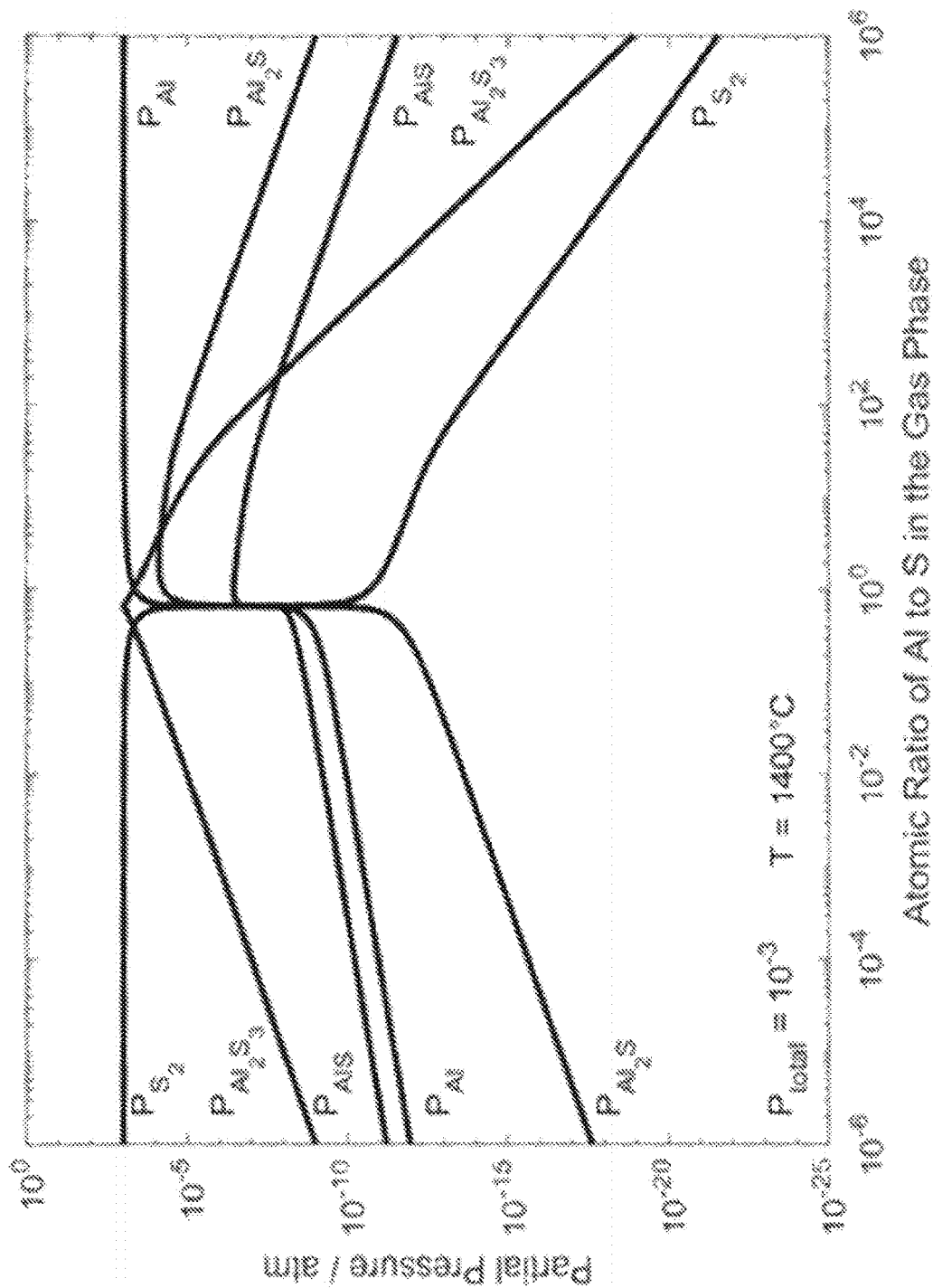
FIG. 9 shows aluminum-sulfur gas phase equilibrium at a temperature of 1400 C and a pressure of $10^{-3}$ atm in accordance with one embodiment.

This equilibrium is illustrated graphically in FIG. 9 at a temperature of 1400 C and a total pressure of $10^{-3}$ atm as a function of aluminum to sulfur element ratio. The vapor phase during aluminothermic reactive vacuum distillation may consist of any number and combination of aluminum-sulfur species, including but not limited to elemental sulfur, aluminum, and aluminum sulfide species. To achieve a given critical aluminum sulfide partial pressure for aluminothermic reduction of the sulfide, a wide span of aluminum to sulfur atomic ratios may be present in the distillate. Sulfur-containing vapor species in the distillate may also form mixed compounds or complexes with other metallic, metalloid, or non-metal elements in the system. Interaction with other species may aid in reduction of the sulfide feedstock and/or sequestration of impurities via reactive leaching and stripping.

For example, shifting the ratio of aluminum to sulfur atoms within the gas phase modulates the aluminum sulfide partial pressure. Dilute species such as $S_8$, $Al_2$, and $Al_2S$ are accounted for but are not depicted here. $Al_2S_3$ partial pressure peaks at the corresponding stoichiometric atomic of aluminum to sulfur atoms in the gas phase. Other gas phase species presently excluded are readily considered using this framework. This equilibrium depiction ignores thermodynamic and solution effects arising from interactions of aluminum and sulfur with the metal sulfide feedstock or metal product. In practice an industrial reactor for aluminothermic reduction via reactive vacuum distillation is often operated far from equilibrium, possibly leading to deviations in gas atmosphere from compositions depicted in FIG. 9.

Figure 10:
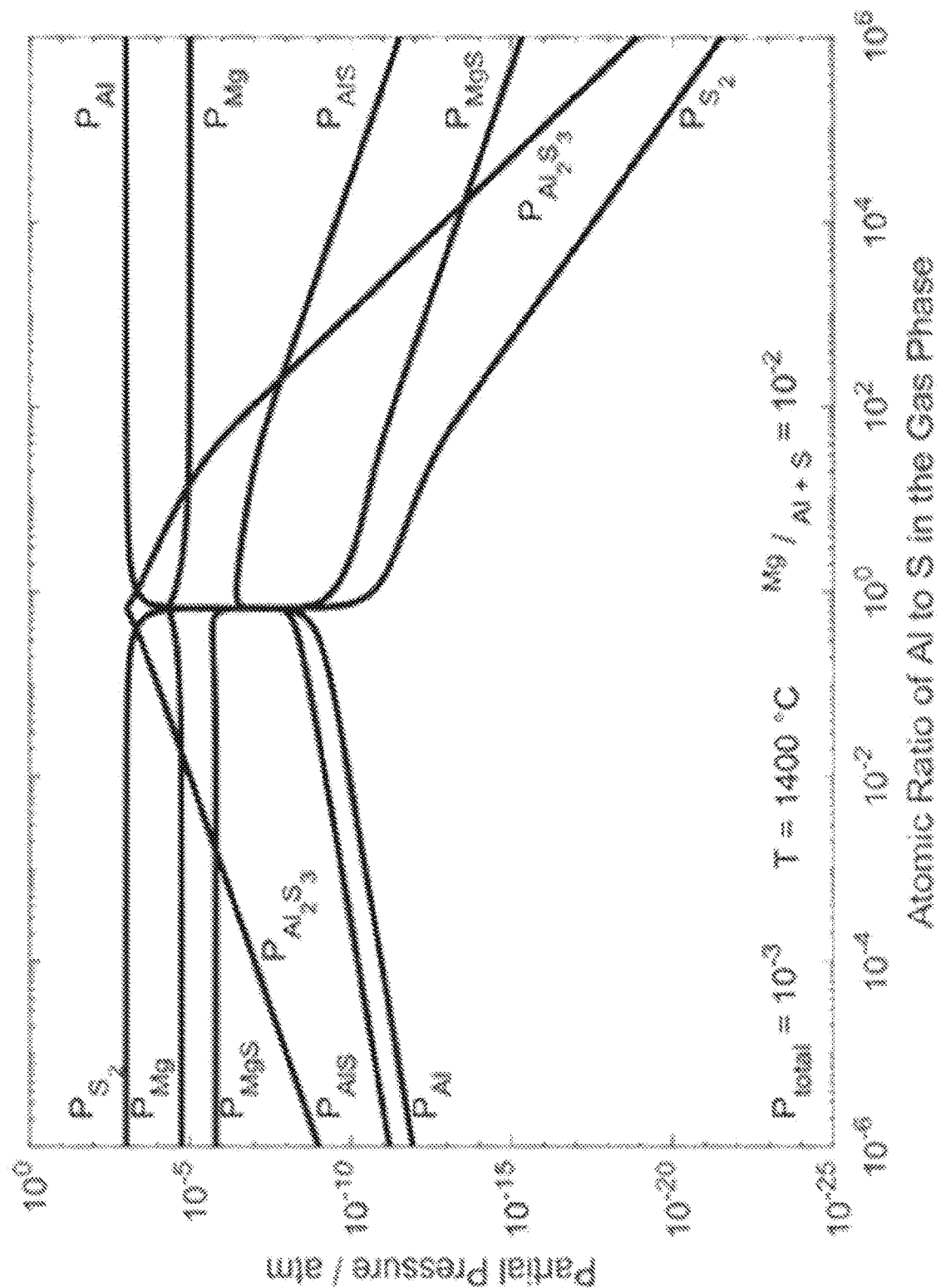
FIG. 10 shows aluminum-sulfur and magnesium-sulfur equilibrium at a temperature of 1400 C and a pressure of $10^{-3}$ atm with the ratio of magnesium atoms to aluminum and sulfur atoms fixed at $10^{-2}$ in accordance with one embodiment.

For example, when magnesium enters the distillate vapor via stripping reactions, gaseous elemental magnesium is stabilized versus gaseous magnesium sulfide by aluminum-sulfur interactions over a wide range of aluminum-sulfur gas phase atomic ratios. FIG. 10 shows aluminum-sulfur and magnesium-sulfur equilibrium at a temperature of 1400 C and a pressure of $10^{-3}$ atm with the ratio of magnesium atoms to aluminum and sulfur atoms fixed at $10^{-2}$ in accordance with one embodiment. Interactions between aluminum and magnesium are not considered here, yet this analysis may be expanded to also consider the formation of mixed metal sulfide compounds. Elemental magnesium partial pressure is buffered by aluminum-sulfur interactions across shifting ratios of aluminum to sulfur atoms in the gas phase.

Figure 11:
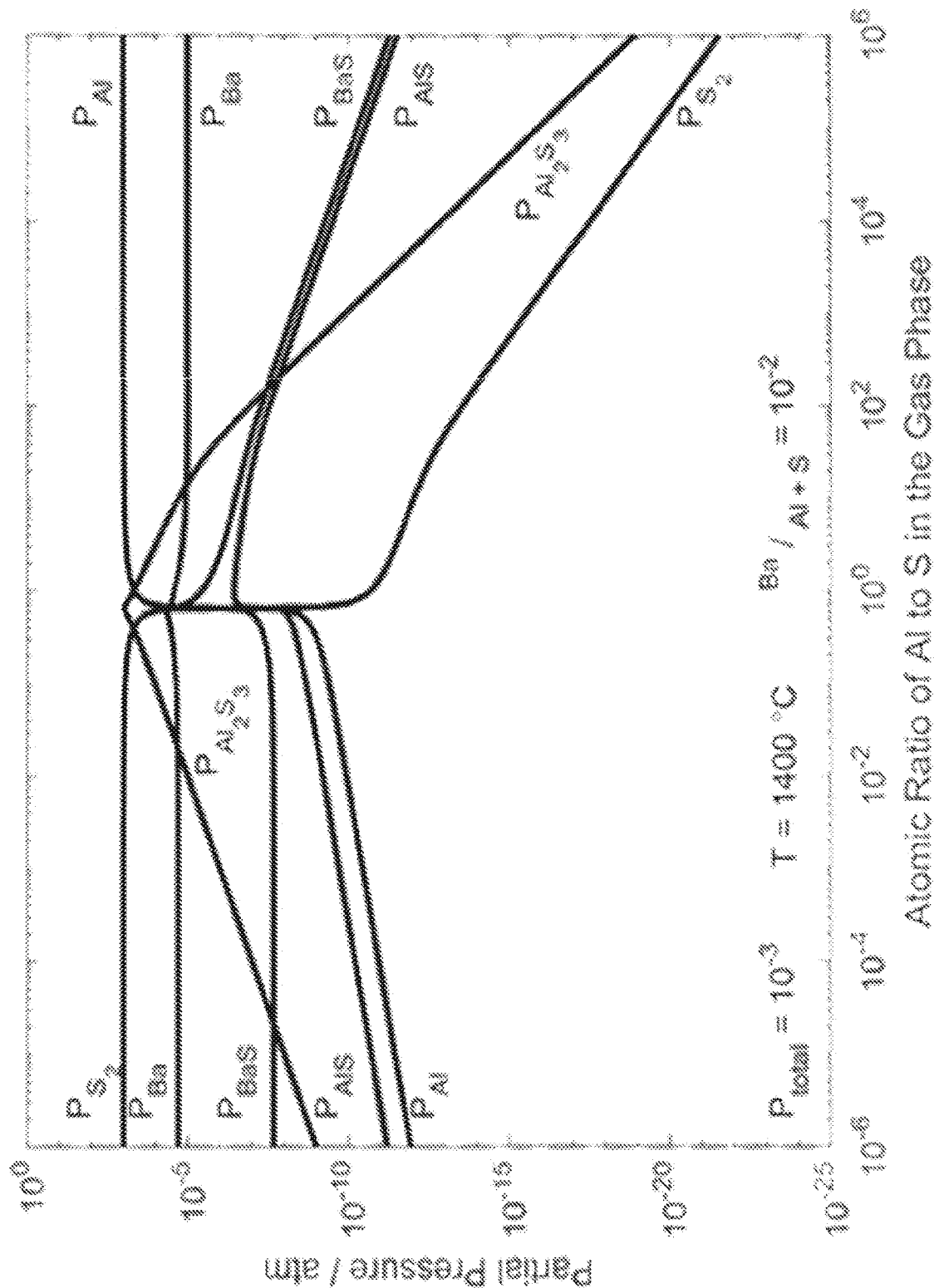
FIG. 11 shows aluminum-sulfur and barium-sulfur equilibrium at a temperature of 1400 C and a pressure of $10^{-3}$ atm with the ratio of barium atoms to aluminum and sulfur atoms fixed at $10^{-2}$ in accordance with one embodiment.

Like aluminum, magnesium is a reactive metal that can aid in reduction, with other s-block elements including but not limited to barium and calcium showing similar tendencies. FIG. 11 shows aluminum-sulfur and barium-sulfur equilibrium at a temperature of 1400 C and a pressure of $10^{-3}$ atm with the ratio of barium atoms to aluminum and sulfur atoms fixed at $10^{-2}$ in accordance with one embodiment. Interactions between aluminum and barium are not considered here, yet this analysis may be expanded to also consider the formation of mixed metal sulfide compounds. Elemental barium partial pressure is buffered by aluminum-sulfur interactions across shifting ratios of aluminum to sulfur atoms in the gas phase.

This vapor phase "buffering-like" behavior therefore enables volatile reactive metal impurities stripped from condensed feedstocks to aid in subsequent reduction. Mixed metal cation gasses may also form, further modulating impurity stripping tendencies during reactive vacuum distillation by lowering the partial pressures of pure elements and binary compounds.

Figure 12:
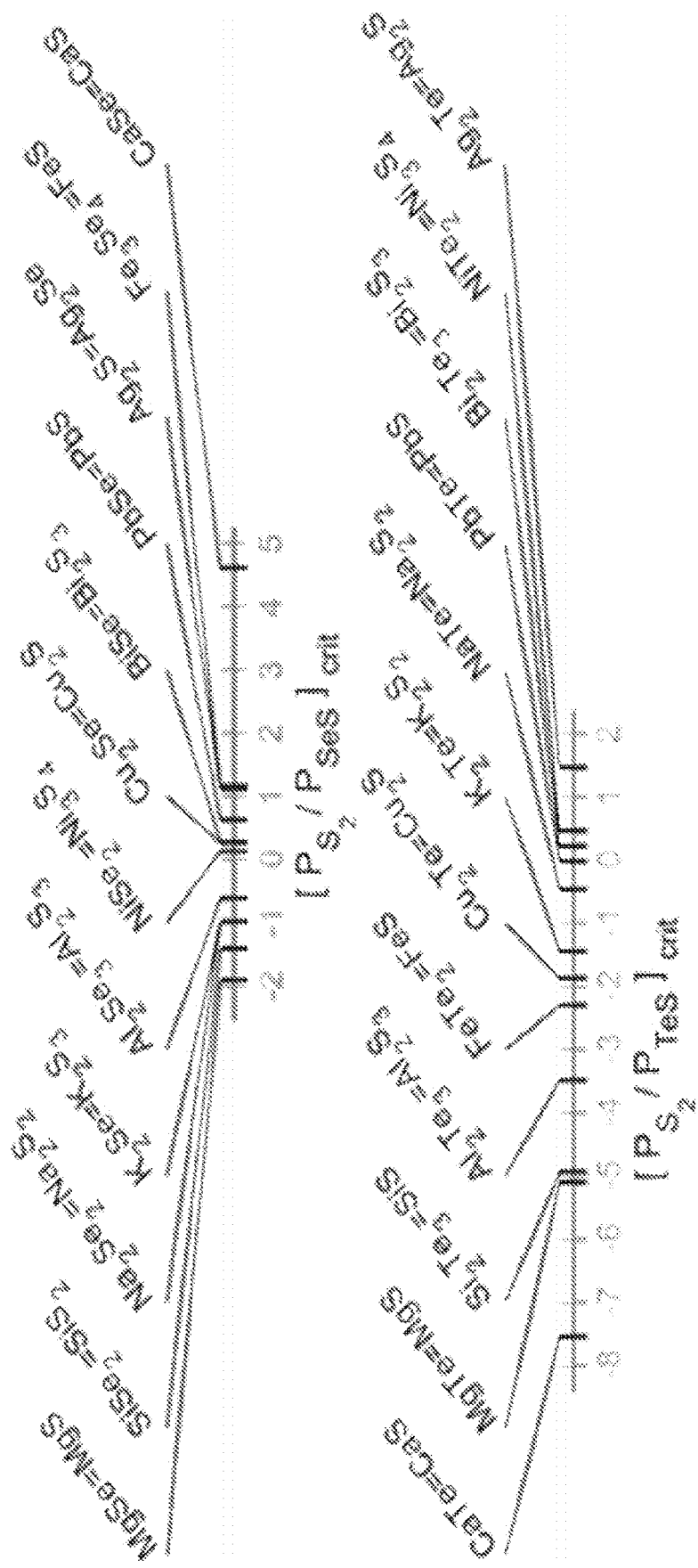
FIG. 12 shows critical ratios of sulfur to selenium and sulfur to tellurium required for stripping via reaction with sulfur distillate species at 800 C in accordance with one embodiment, where $[P_{S_2}/P_{SeS}]_{crit}$ and $[P_{S_2}/P_{TeS}]_{crit}$ refer to the ratios of sulfur to selenium sulfide and sulfur to tellurium sulfide in the gas phase.

Anion impurities may be stripped during aluminothermic reduction of sulfides via reactive vacuum distillation to form volatile compounds containing the impurity. Depending on the impurity's relative affinity for metallic elements in the vapor phase or sulfur, the impurity may form a compound with a metallic element, sulfur, other anion impurities, or some polyatomic combination thereof. For example, when the ratio of the impurity to sulfur is sufficiently high, p-block elements such as arsenic, antimony, selenium, and tellurium can be stripped by elemental sulfur in the distillate to form volatile sulfides that subsequently also enter the vapor. In FIG. 12, which shows critical ratios of sulfur to selenium and sulfur to tellurium required for stripping via reaction with sulfur distillate species at 800 C in accordance with one embodiment (where $[P_{S_2}/P_{SeS}]_{crit}$ and $[P_{S_2}/P_{TeS}]_{crit}$ refer to the ratios of sulfur to selenium sulfide and sulfur to tellurium sulfide in the gas phase), sulfur to selenium species and sulfur to tellurium species ratios are presented for removal of these impurities from some metals in the absence of solution effects. Such ratios are also readily defined in the presence of solution effects, yet this determination will be feedstock dependent. Stripping results for arsenic, selenium, and antimony with elemental sulfur from copper-containing mineral sulfides are reported in Table 4.

TABLE 4

Stripping of arsenic, antimony, and selenium from copper-containing mineral sulfides using sulfur vapors

| | Enargite | | Tennantite | |
|---|---|---|---|---|
| Impurity | Initial | After Stripping | Initial | After Stripping |
| Arsenic | 5.1 wt % | 0.06 wt % | 0.76 wt % | <0.01 wt % |
| Antimony | 0.34 wt % | 0.08 wt % | 4.4 wt % | 0.79 wt % |
| Selenium | <0.01 wt % | <0.01 wt % | 0.30 wt % | 0.04 wt % |

Upon stripping with sulfur gas at 800 C, arsenic, antimony, and selenium impurity contents were decreased by 72%-99%. Stripping rates for these impurities further increase at higher temperatures employed for aluminothermic reduction via reactive vacuum distillation. Depending on the ratio of aluminum to sulfur in the reduction distillate, the sulfur source for these stripping reactions may be elemental sulfur, aluminum sulfide or other metal sulfide species.

For another example, the following demonstrates ferrous and nonferrous products of sulfide reduction via reactive vacuum distillation.

Figure 13:
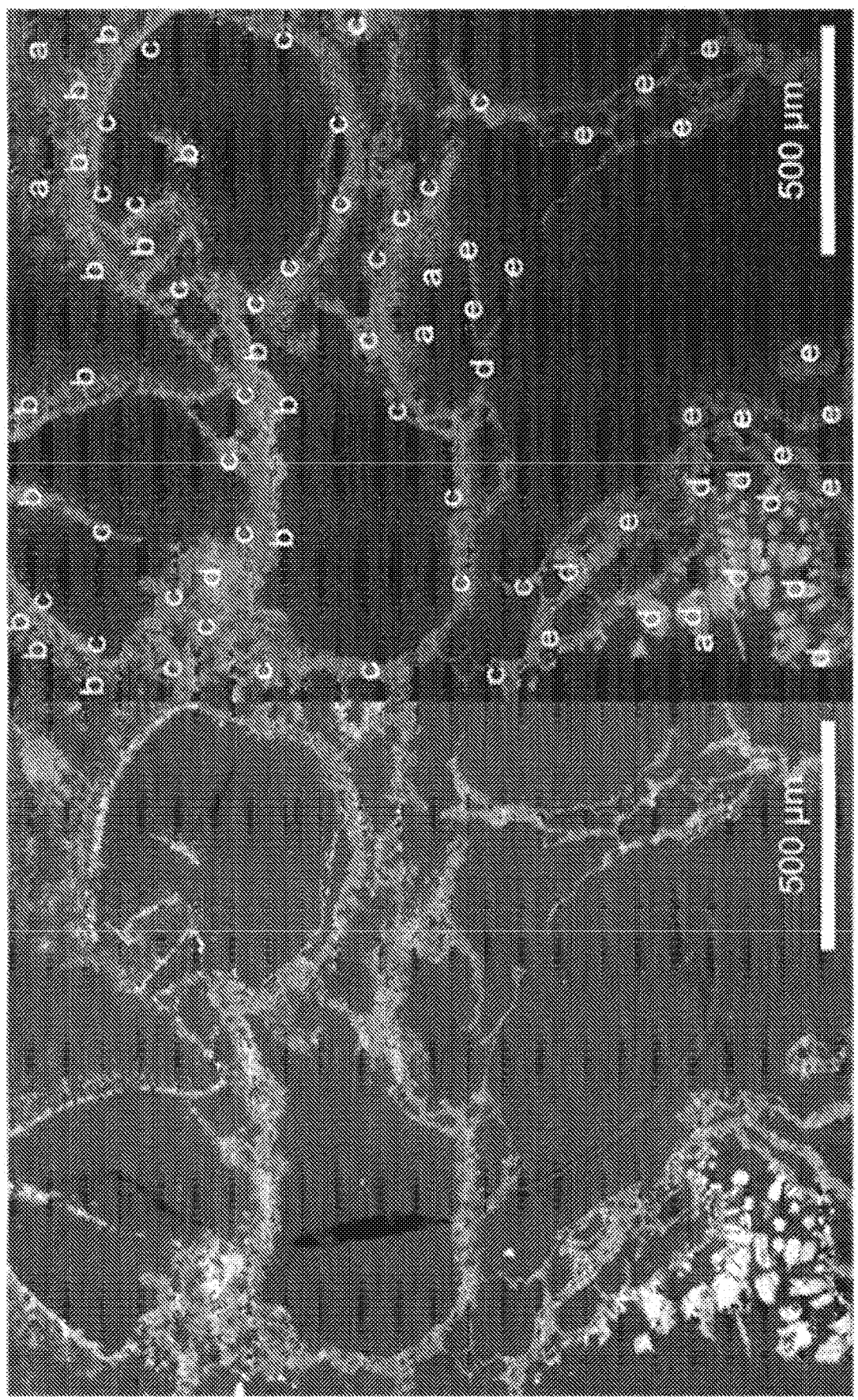
FIG. 13 shows an SEM/BEC image (left) and an SEM/EDS element map (right) detailing aluminothermic reduction of titanium from titanium sulfide via reactive vacuum distillation in accordance with one embodiment.
Figure 14:
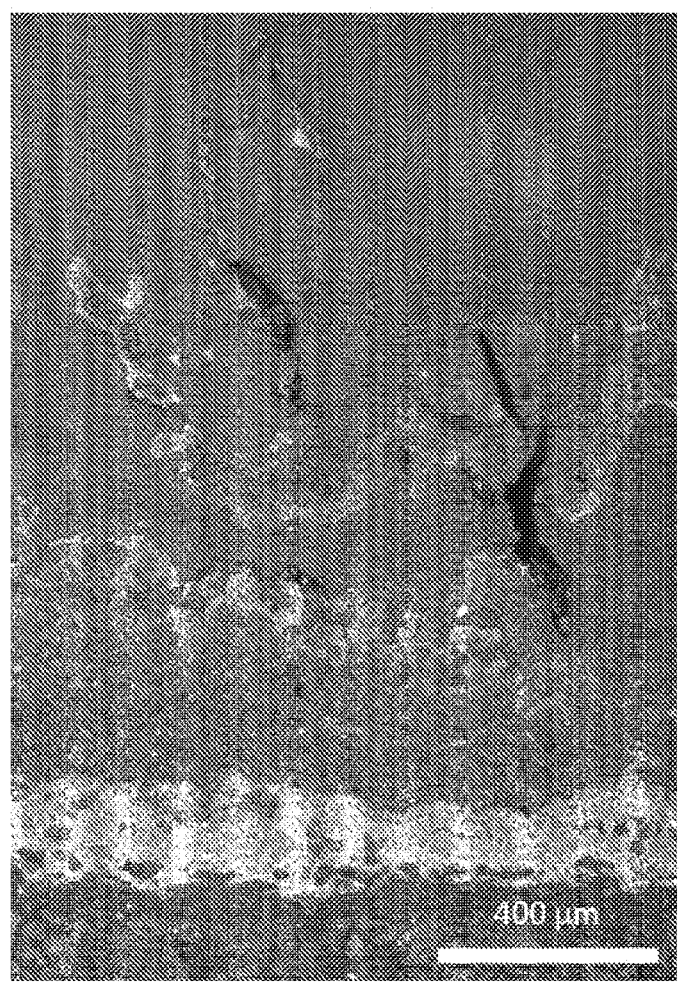
FIG. 14 shows a titanium metal phase produced via aluminothermic reduction of titanium sulfide using reactive vacuum distillation in accordance with one embodiment.

In addition to aluminum alloys, reduction of sulfides via reactive vacuum distillation is also applicable to ferrous and other nonferrous metal and alloy products. In one example, titanium metal and alloys were produced from titanium sulfide using aluminothermic reduction via reactive vacuum distillation. Two grams of titanium sulfide were introduced along with 2 grams of metallic aluminum into the reactor. The reaction took place at a temperature between 1300 C and 1900 C and a total pressure of $10^{-4}$ to $10^{-1}$ atm over times ranging from 20 minutes to 1 hour. During the reaction, gaseous aluminum and/or aluminum sulfide species are volatized from the system while producing metallic titanium or titanium-aluminum alloy from titanium sulfide. FIG. 13 shows an SEM/BEC image (left) and an SEM/EDS element map (right) detailing aluminothermic reduction of titanium from titanium sulfide via reactive vacuum distillation in accordance with one embodiment. In this embodiment, the reactor was quenched while at temperature to provide a snapshot of the reaction underway. Phase "a" corresponds to aluminum, phase "b" corresponds to aluminum sulfide, phase "c" corresponds to aluminum-titanium sulfide, phase "d" corresponds to titanium sulfide, and phase "e" corresponds to titanium. FIG. 14 shows a titanium metal phase produced via aluminothermic reduction of titanium sulfide using reactive vacuum distillation in accordance with one embodiment. Aluminum and aluminum sulfide species were distilled and condensed at the top of the reactor, leaving titanium metal and/or alloy products below. Aluminum contents below 1 wt % and sulfur contents below 0.5 wt % were achieved in the titanium metal product. Both higher and lower contents of aluminum and sulfur in the titanium product are obtainable through tuning of reactor conditions and reaction time. Aluminum metal and aluminum sulfide species were observed in the condensed distillate, with an aluminum to sulfur atomic ratio exceeding that of stoichiometric $Al_2S_3$. The temperature and pressure can be varied over the course of the reaction, with increasing temperature and decreasing pressure both increasing the ratio of aluminum to sulfur entering the distillate. Other feedstocks may be mixed with the titanium sulfide for direct production of titanium alloys, such as vanadium metal, oxides, or sulfides for production of titanium-aluminum-vanadium alloys.

In other embodiments, the bulk content of the distillate is sulfur-rich, such as in recycling of rare earth magnets to produce rare earth sulfides and iron alloys. Magnet feedstock employed contained predominantly iron, neodymium, praseodymium, dysprosium, terbium, and boron. Small amounts of other rare earth elements were also present. Copper, nickel, cobalt, molybdenum, niobium, gallium, and aluminum may also be found in rare earth magnets. Aluminum content in the magnet or magnet machining swarf may range from trace up to several percent. In end-of-life recycling feedstocks, the aluminum content may be up to 90%. Therefore, aluminum may be either added directly or already present in the form of feedstock components or impurities.

60 grams of N38SH grade magnets were sulfidized at temperatures between 900 C and 1100 C under sulfur partial pressures of 0.1 to 0.8 atm following methods described in U.S. patent application Ser. No. 17/134,429 entitled SELECTIVE SULFIDATION AND DESULFIDATION. The sulfidation reaction generally occurred over the course of several minutes to several hours. A mix of iron sulfide, rare earth sulfide, and metallic phases were formed during sulfidation, tabulated below in Table 5 via quantitative x-ray diffraction (QXRD):

TABLE 5

Sulfidized Magnet Composition via QXRD

| Phase | Partially Sulfidized | Fully Sulfidized |
| --- | --- | --- |
| Rare Earth Sulfide | 26-37 wt % | 63 wt % |
| Iron Sulfide | 57-58 wt % | 27 wt % |
| Metal | 2-5 wt % | <1 wt % |
| Unidentified Crystalline | 0-15 wt % | 10 wt % |
| Amorphous | Excluded | Excluded |

Figure 15:
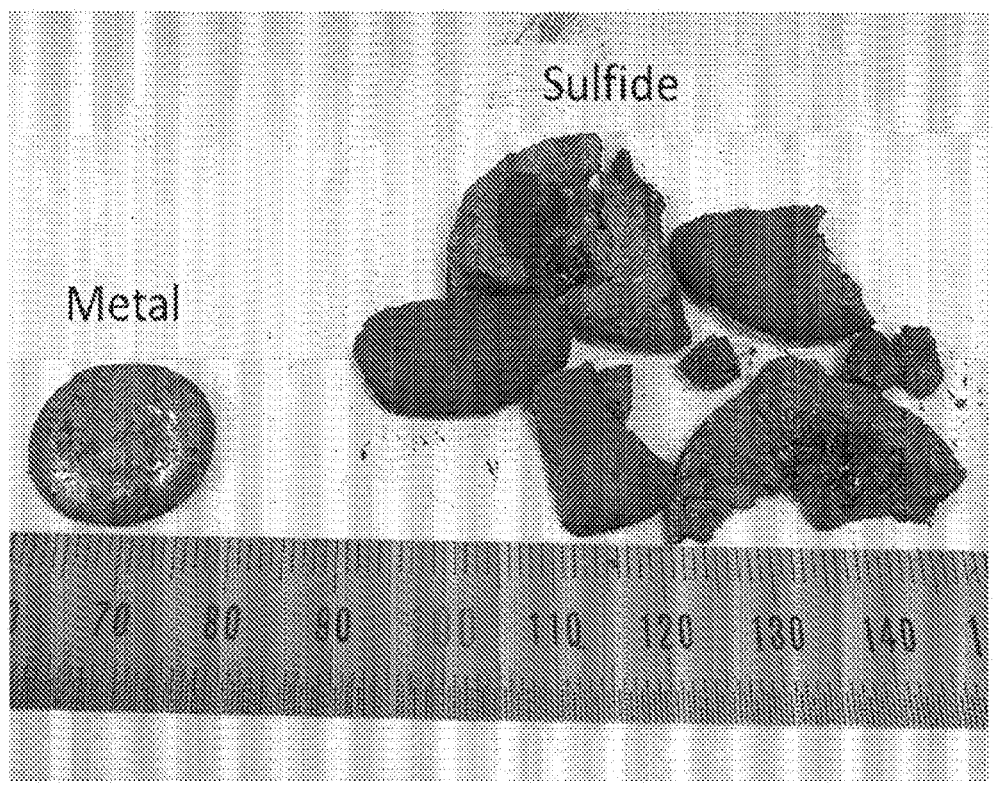
FIG. 15 shows iron-rich metal and neodymium-rich sulfide produced via application of sulfidation and reactive vacuum distillation to rare earth magnet recycling in accordance with one embodiment.

The sulfidized magnet was then treated via reactive vacuum distillation at a temperature between 1500 C and 1800 C and a total pressure of $10^{-4}$ to $10^{-1}$ atm for times ranging from 20 minutes to one hour. Under these conditions, neodymium and praseodymium were left as non-volatile sulfides while iron sulfide decomposed to metallic iron and sulfur gas. Sulfide and metal products are illustrated in FIG. 15, which shows iron-rich metal and neodymium-rich sulfide produced via application of sulfidation and reactive vacuum distillation to rare earth magnet recycling. The metallic iron produced via thermal decomposition and reactive vacuum distillation simultaneously served as an in-situ liquid-metal collector phase for selective extraction of other rare earth elements from the sulfide. Partitioning of rare earth elements between metallic and sulfide products are shown in Table 6 as measured via wavelength dispersive x-ray spectroscopy/electron microprobe analysis (WDS/EPMA). Separation of rare earths was achievable using the liquid iron collector phase synthesized via reactive vacuum distillation. Here, the distillate was sulfur-rich, with an aluminum to sulfur atomic ratio in the distillate less than that of stoichiometric $Al_2S_3$. However, the aluminum to sulfur ratio of the distillate will vary based on the aluminum content in the reactive vacuum distillation feedstock. Boron impurities were removed during reactive vacuum distillation via reactive stripping with sulfur-containing species, with residual boron partitioning to the metal phase.

TABLE 6

Partitioning of Iron and Rare Earth Elements between Sulfide and Metal Phases via WDS/EPMA

| | Phase | |
| --- | --- | --- |
| Element | Sulfide | Metal |
| Fe | 0.2 wt % | 92.6 wt % |
| La | 0.8 wt % | <0.1 wt % |
| Ce | <0.1 wt % | 0.1 wt % |
| Pr | 12.2 wt % | 0.1 wt % |
| Nd | 56.0 wt % | <0.1 wt % |
| Sm | <0.1 wt % | 0.1 wt % |
| Eu | <0.1 wt % | 2.6 wt % |
| Gd | 3.2 wt % | <0.1 wt % |
| Tb | <0.1 wt % | 0.9 wt % |
| Dy | 1.2 wt % | 0.3 wt % |
| Ho | <0.1 wt % | 0.3 wt % |
| Er | 0.3 wt % | 0.8 wt % |
| Tm | <0.1 wt % | 0.2 wt % |
| Yb | <0.1 wt % | <0.1 wt % |
| Lu | 2.0 wt % | <0.1 wt % |

In sulfidation and reactive vacuum distillation for rare earth magnet recycling, the low aluminum to sulfur ratio in that example (below that which is required for stoichiometric aluminothermic reduction of the iron sulfide to form volatile aluminum sulfide) illustrates that a metallic iron collector phase for selective extraction of rare earth elements from sulfides may also be generated through thermal reduction of iron sulfide. In such a scenario, a metallic extractor phase may be produced through direct thermal decomposition of a metal sulfide (including but not limited to sulfides of iron, aluminum, copper, nickel, cobalt, lead, tin, zinc, gallium, bismuth and/or barium), even in the absence of aluminum or aluminothermic reduction. Likewise, by adding iron or another metallic element in the form of a metal, oxide, or sulfide to a feedstock prior to sulfidation, subsequent thermal treatment of the sulfidized mixture can yield a metal extractant phase that selectively forms an alloy between the added metal and components of the feedstock through metallothermic or reactive leaching, with or without aluminum present.

In another example, iron oxide was added to a rare earth monazite phosphate mineral prior to sulfidation. Upon sulfidation, iron oxide was sulfidized. Monazite may remain as a phosphate following sulfidation, or itself may form an oxide, oxysulfide, or sulfide compound. We envision that these materials could then undergo reactive vacuum distillation (with or without aluminum) to thermally decompose iron sulfide to iron metal and sulfur gas. We anticipate that this iron phase may then be able to metallothermically or reactively leach other components from the rare monazite mineral, including rare earth elements or normally occurring radioactive materials such as thorium. We anticipate that this approach is readily extended to other feedstocks, including minerals and electronic waste (e-waste). Sulfur evolved from iron sulfide decomposition may then exhibit stripping behavior similar to that observed in aluminum-sulfur atmospheres. By controlling the ratio of select metallic elements (in either metal, oxide, or sulfide form) to sulfur in a feedstock, reactive vacuum distillation and thermal treatment with or without aluminum can be used to selectively produce alloy products. Iron addition and control of the iron to sulfur to other metallic element ratio in a feedstock are therefore useful process levers to design selectivity in the composition of an alloy product in our invention. Different alloy products including but not limited to those of aluminum, nickel, and copper may leverage different metal additions (in the form of metals, oxides, or sulfides) to achieve selectivity in alloy production through metallothermic leaching.

Figure 16:
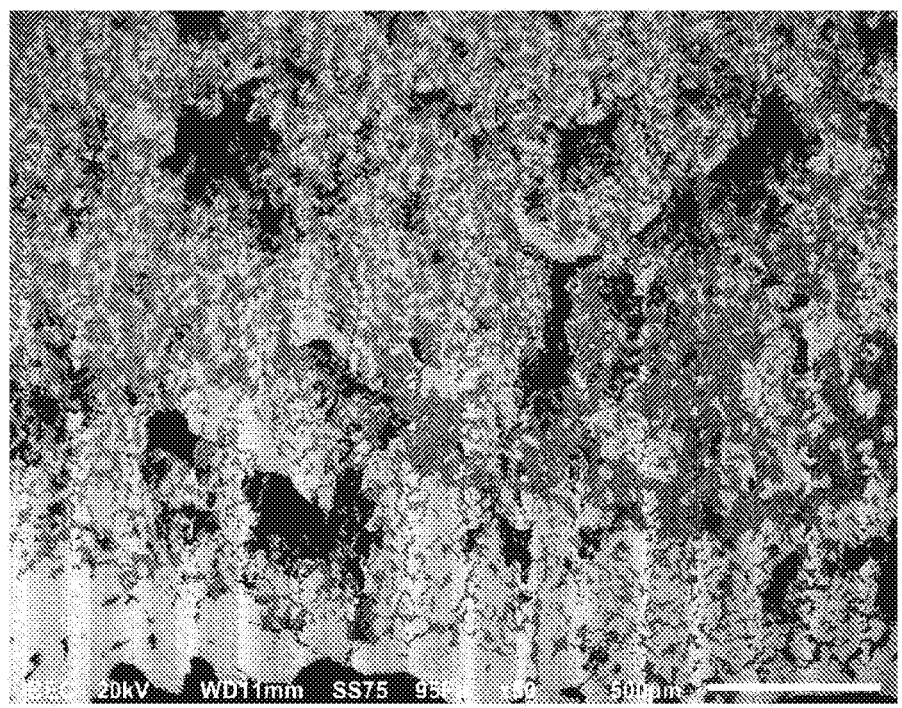
FIG. 16 shows sulfidized chromite concentrate in accordance with one embodiment, where light phases correspond to iron-chromium-rich sulfide and dark phases correspond to magnesium-silicon-aluminum-rich oxide phases.

In addition to reactive stripping, impurities may also be managed in metal production through reactive leaching with the aluminum. In another example, ferrochromium was produced from selectively sulfidized chromite concentrate using aluminothermic reduction, reactive leaching, and reactive stripping via reactive vacuum distillation. The composition of the chromium concentrate prior to sulfidation is shown in Table 7. The chromium concentrate was selectively sulfidized at temperatures between 1200 C and 1500 C under a sulfur partial pressure of 0.1 to 0.8 atm following methods described in in U.S. patent application Ser. No. 17/134,429 entitled SELECTIVE SULFIDATION AND DESULFIDATION. Following sulfidation, oxide and sulfide phases were intertwined, with grain sizes on the order of 50-200 microns. FIG. 16 shows sulfidized chromite concentrate in accordance with one embodiment, where light phases correspond to iron-chromium-rich sulfide and dark phases correspond to magnesium-silicon-aluminum-rich oxide phases. Iron and chromium preferentially sulfidized, while aluminum, silicon, and magnesium preferentially partitioned to oxide phases. The iron-chromium sulfide phases contained residual oxygen, magnesium, silicon, and aluminum impurities at approximately 5-15 at %, 2-4 at %, 3-5 at %, and 3-6 at % respectively. Meanwhile, the oxide phases contained some residual iron, chromium, and sulfur at approximately 3-6 at %, 5-10 at %, and 5-8 at % respectively.

TABLE 7

Chromite Concentrate Composition

| Component | Composition |
|---|---|
| MgO | 11.7 wt % |
| $SiO_2$ | 2.7 wt % |
| $Al_2O_3$ | 13.9 wt % |
| $Cr_2O_3$ | 47.2 wt % |
| FeO | 24.6 wt % |

Figure 17:
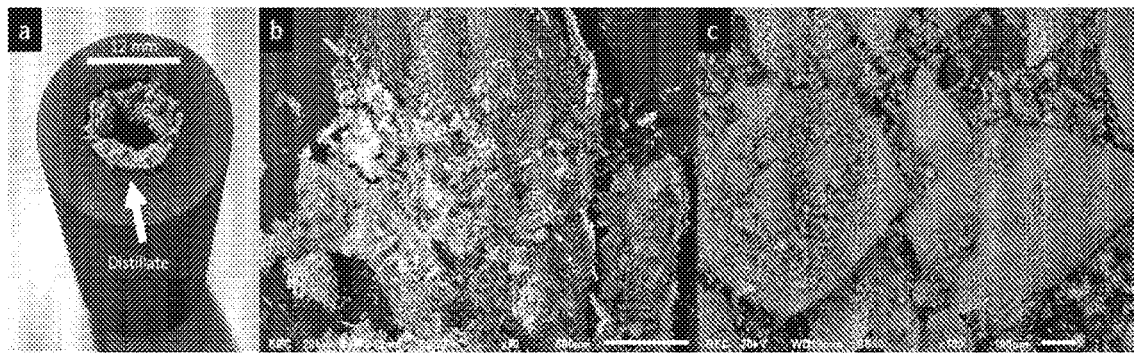
FIG. 17 shows a condensed distillate phase following aluminothermic reduction of sulfidized chromite in accordance with one embodiment.

A 1.4-gram chunk of sulfidized chromite concentrate was reacted with 0.05 grams of liquid aluminum at temperatures between 1500 C and 2000 C under pressures of $10^{-4}$ to $10^{-1}$ atm for 40 minutes. The sulfide phase was reactively leached from the oxide-sulfide matrix with metallic aluminum, forming ferrochromium alloy and gaseous aluminum sulfide. The gaseous aluminum sulfide subsequently stripped residual aluminum, silicon, magnesium, and oxygen impurities from the sulfide, forming a mixed aluminum-silicon-magnesium-oxygen-sulfur distillate vapor. These gasses subsequently reacted with the oxide phase. This illustrates that in addition to metallic inputs, aluminum for reactive vacuum distillation, leaching, and stripping may be at least partially sourced from a nonmetallic phase such as an oxide. Residual iron and chromium in the oxide were sulfidized and aluminothermically reduced to metal. Silicon, magnesium, and aluminum oxides were stripped and also entered the distillate. Like aluminum, metallic silicon and magnesium may serve as reducing agents, indicating that metallic intermediates formed during the stripping reaction can also contribute to reduction. The condensed distillate is shown in FIG. 17, and observed via scanning electron microscope/backscatter electron composition (SEM/BEC) to be a non-homogeneous mixture of different chemical compounds. Panel a shows that the distillate was condensed as a crust at the top of the reactor. Panels b, and c show that the distillate contains an inhomogeneous mix of aluminum, silicon, and magnesium oxides, oxysulfides, and sulfides. In addition to magnesium, other S block elements including but not limited to calcium, barium, sodium, and potassium can exhibit similar stripping behavior when appropriate reactor conditions are employed.

Figure 18:
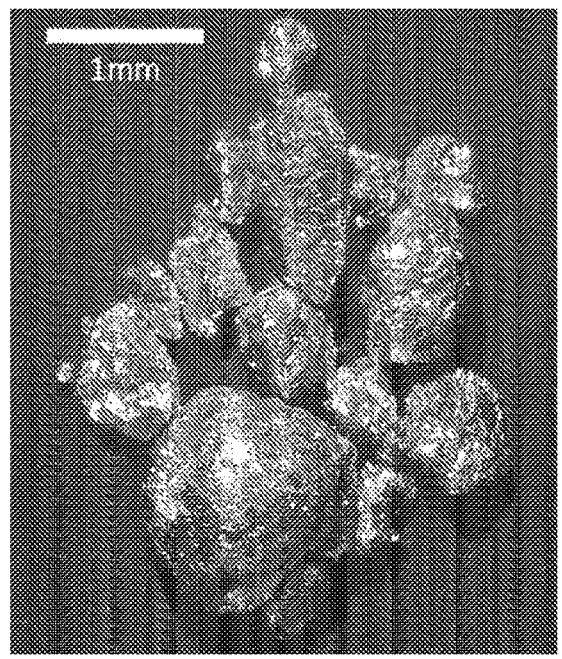
FIG. 18 shows ferrochromium produced via aluminothermic reduction of sulfidized chromite concentrate using reactive vacuum distillation in accordance with one embodiment.

The combination of reactive leaching and stripping processes yielded metallic ferrochromium free of gangue oxide inclusions, shown in FIG. 18. Aluminum, silicon, and magnesium impurities in the metal product are all found to be less than 1 wt %. Other feedstocks may be co-sulfidized with the chromite or mixed with the feedstock prior to aluminothermic treatment to produce multicomponent alloys. Adding a nickel source to the iron-chromium sulfide feed, such as sulfidized laterite, may be used to enable the direct production of stainless-steel alloys.

In summary, as described herein, our aluminothermic reactive vacuum distillation, absorption, stripping, and extraction technology presents a paradigm shift in how alloys can be produced and how metallic elements can be recycled and reintroduced into metal products. The following is a summary of some key innovations put forth by our technology:

Aluminothermic reduction of metal sulfides via reactive vacuum distillation

Usage of aluminum for metallothermic reduction of alloys that previously required calciothermic or magnesiothermic reduction Integration of reactive vacuum distillation and reactive absorption into a single aluminothermic reduction process Selective aluminothermic extraction and reduction of sulfides from oxides in a single processing step Aluminothermic production of a gas stripping agent via reactive vacuum distillation Reactive casting during reactive vacuum distillation, absorption, stripping, and extraction Integration of scrap refining and master alloy production into a single processing step Usage of lower purity feedstocks in metal and master alloy production, such as machining waste (swarf), recycled materials of known composition, dross from primary electrolytic production or recycling, recycled or synthesize master alloys (and or the waste from master alloy production), ores or mineral concentrates (sulfidized, selectively sulfidized, or natural), or even unsorted scrap as either the base metal solvent, alloy solute, or aluminum reductant source Integration of refining and reduction into a single processing step Integration of aluminothermic processing with selective sulfidation Production of a metal extractant or collector phase via aluminothermic reduction and/or thermal decomposition of a sulfide compound FIG. 19 is a flow diagram encompassing various processes in accordance with example embodiments. Process 1902 dissolves a sulfide of a first metal in a solvent comprising molten aluminum. It should be noted that in some cases the sulfide may not fully dissolve in the solvent comprising molten aluminum. Process 1904 aluminothermically reduces at least a portion of the sulfide through reactive vacuum distillation to form gaseous aluminum sulfide distillate and elemental first metal that remains in the molten aluminum. It should be noted that at least a portion of the sulfide may be aluminothermically reduced at the interface of the sulfide and the molten aluminum through reactive vacuum distillation to form gaseous aluminum sulfide distillate and elemental first metal that remains in the molten aluminum. Process 1906 optionally reacts the aluminum sulfide distillate with at least one material in the molten aluminum and/or at least one material outside of the molten aluminum. Process 1908 optionally condenses the gaseous aluminum sulfide distillate. Process 1910 optionally adds a third metal or compound of the third metal to the molten aluminum to produce an alloy including the third metal and at least one of aluminum or the first metal, where the compound of the third metal may be aluminothermically or thermally reduced/decomposed prior to alloying. The process may further involve vacuum distillation of aluminum from an alloy of aluminum and at least one of the first metal or the third metal to enrich the alloy in at least one of the first metal or the third metal. Process 1912 optionally recovers at least some of the first metal from the molten aluminum. Process 1914 optionally oxidizes at least some of the first metal in the molten aluminum. Process 1916 optionally extracts sulfide from a surrounding oxide (e.g., the molten aluminum may include a mixture of the first metal sulfide and at least one oxide) via selective aluminothermic reduction of the sulfide. Process 1918 optionally includes at least one other element in the molten aluminum that forms at least one gaseous volatile sulfide that in turn assists the aluminum in reduction, in which case the process may selectively condense at least one of the at least one gaseous volatilized sulfide. The process of reacting the aluminum sulfide distillate with at least one material in the molten aluminum may involve reactive stripping or reactive absorption. The process may further involve aluminum sulfide distillate or at least one of the at least one gaseous volatized sulfide reacting with at least one element from an oxide to form a sulfide which may be aluminothermically reduced via reactive vacuum distillation. In any of these embodiments, the first metal sulfide that is dissolved in the solvent comprising molten aluminum may be formed by selectively sulfidizing the first metal. In an alternative embodiment, a sulfide of the third metal may be contacted with a sulfide of a fourth metal in the absence of aluminum, in which the sulfide of the third metal is thermally decomposed, producing an alloy of the third metal and some or all of the fourth metal.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method comprising:
dissolving at least a portion of a sulfide of a first metal in a solvent comprising molten aluminum;
aluminothermically reducing at least a portion of the sulfide through reactive vacuum distillation to form gaseous aluminum sulfide distillate and elemental first metal that remains in the molten aluminum; and
reacting the aluminum sulfide distillate with at least one material in the molten aluminum.

2. The method according to claim 1, wherein the process produces an alloy comprising at least aluminum and the first metal, optionally also including vacuum distilling a metal from the alloy and optionally reacting the distillate metal with gaseous sulfur to form a volatile sulfide.

3. The method according to claim 1, further comprising at least one of:
recovering at least some of the first metal from the molten aluminum;
oxidizing at least some of the first metal in the molten aluminum; or
adding a third metal or a compound of the third metal to the molten aluminum to produce an alloy including the third metal and at least one of aluminum or the first metal, optionally wherein at least one of:
(a) the compound of the third metal is aluminothermically reduced; or
(b) the compound of the third metal is thermally reduced.

4. The method according to claim 1, wherein the molten aluminum includes a mixture of the first metal sulfide and at least one oxide, the process extracting the sulfide from the surrounding oxide via selective aluminothermic reduction of the sulfide.

5. The method according to claim 1, wherein the molten aluminum comprises at least one other element that forms at least one gaseous volatile sulfide that in turn assists the aluminum in reduction, optionally also selectively condensing at least one of the at least one gaseous volatilized sulfide.

6. The method according to claim 1, wherein reacting the aluminum sulfide distillate with at least one material in the molten aluminum comprises at least one of reactive stripping or reactive absorption.

7. The method according to claim 1, further comprising:
selectively sulfidizing the first metal to form the first metal sulfide that is at least partially dissolved in the solvent comprising molten aluminum.

8. A method comprising:
dissolving at least a portion of a sulfide of a first metal in a solvent comprising molten aluminum;
aluminothermically reducing at least a portion of the sulfide through reactive vacuum distillation to form gaseous aluminum sulfide distillate and elemental first metal that remains in the molten aluminum; and
reacting the aluminum sulfide distillate with at least one material outside of the molten aluminum.

9. The method according to claim 8, wherein the process produces an alloy comprising at least aluminum and the first metal, optionally also including vacuum distilling a metal from the alloy and optionally reacting the distillate metal with gaseous sulfur to form a volatile sulfide.

10. The method according to claim 8, further comprising at least one of:
recovering at least some of the first metal from the molten aluminum;
oxidizing at least some of the first metal in the molten aluminum; or adding a third metal or a compound of the third metal to the molten aluminum to produce an alloy including the third metal and at least one of aluminum or the first metal, optionally wherein at least one of:
(a) the compound of the third metal is aluminothermically reduced; or
(b) the compound of the third metal is thermally reduced.

11. The method according to claim 8, wherein the molten aluminum includes a mixture of the first metal sulfide and at least one oxide, the process extracting the sulfide from the surrounding oxide via selective aluminothermic reduction of the sulfide.

12. The method according to claim 8, wherein the molten aluminum comprises at least one other element that forms at least one gaseous volatile sulfide that in turn assists the aluminum in reduction, optionally also selectively condensing at least one of the at least one gaseous volatilized sulfide.

13. The method according to claim 8, further comprising:
selectively sulfidizing the first metal to form the first metal sulfide that is at least partially dissolved in the solvent comprising molten aluminum.

14. A method comprising:
dissolving at least a portion of a sulfide of a first metal in a solvent comprising molten aluminum;
aluminothermically reducing at least a portion of the sulfide through reactive vacuum distillation to form gaseous aluminum sulfide distillate and elemental first metal that remains in the molten aluminum; and
condensing the gaseous aluminum sulfide distillate.

15. The method according to claim 14, wherein the process produces an alloy comprising at least aluminum and the first metal, optionally also including vacuum distilling a metal from the alloy and optionally reacting the distillate metal with gaseous sulfur to form a volatile sulfide.

16. The method according to claim 14, further comprising at least one of:
recovering at least some of the first metal from the molten aluminum;
oxidizing at least some of the first metal in the molten aluminum; or
adding a third metal or a compound of the third metal to the molten aluminum to produce an alloy including the third metal and at least one of aluminum or the first metal, optionally wherein at least one of:
(a) the compound of the third metal is aluminothermically reduced; or
(b) the compound of the third metal is thermally reduced.

17. The method according to claim 14, wherein the molten aluminum includes a mixture of the first metal sulfide and at least one oxide, the process extracting the sulfide from the surrounding oxide via selective aluminothermic reduction of the sulfide.

18. The method according to claim 14, wherein the molten aluminum comprises at least one other element that forms at least one gaseous volatile sulfide that in turn assists the aluminum in reduction, optionally also selectively condensing at least one of the at least one gaseous volatilized sulfide.

19. The method according to claim 14, further comprising:
   selectively sulfidizing the first metal to form the first metal sulfide that is at least partially dissolved in the solvent comprising molten aluminum.

\* \* \* \* \*